(12) United States Patent
Jost et al.

(10) Patent No.: US 7,043,439 B2
(45) Date of Patent: May 9, 2006

(54) MACHINE INTERFACE

(75) Inventors: Uwe Helmut Jost, Haslemere (GB); Wide Roeland Hogenhout, Wemmel (BE)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 09/817,342

(22) Filed: Mar. 27, 2001

(65) Prior Publication Data

US 2002/0055916 A1 May 9, 2002

(30) Foreign Application Priority Data

Mar. 29, 2000 (GB) .................................... 0007658
Mar. 30, 2000 (GB) .................................... 0007755

(51) Int. Cl.
*G10L 15/00* (2006.01)

(52) U.S. Cl. .................. 704/275; 379/88; 345/727
(58) Field of Classification Search ................ 704/270, 704/275; 379/88.23; 345/727
See application file for complete search history.

(56) References Cited

U.S. PATENT DOCUMENTS 4,785,408 A * 11/1988 Britton et al. .............. 704/270
5,561,796 A 10/1996 Sakamoto et al. .......... 395/600
5,937,422 A 8/1999 Nelson et al. .............. 707/531

(Continued)

FOREIGN PATENT DOCUMENTS

| JP | 05-2857 | 1/1993 |
|----|---------|--------|
| JP | 08-272660 | 10/1996 |
| JP | 09-91108 | 4/1997 |
| JP | 2001-101228 | 4/2001 |

(Continued)

OTHER PUBLICATIONS

"Algorithm Definition", accessed Jan. 20, 2004 via internet http://www.risc.uni-linz.ac.at/people/blurock/ANALYSIS/manual/document/node30 . . . .

(Continued)

*Primary Examiner*—Daniel Abebe
(74) *Attorney, Agent, or Firm*—Fitzpatrick, Cella, Harper & Scinto

(57) ABSTRACT

A machine interface allows a user to select a machine operation. A plurality of questions are stored for output to a user. A score indicating the likelihood that the user will select a machine operation is stored for each corresponding machine operation. A next question for output to the user is selected from the stored questions by determining, for each of a plurality of the questions, an average of the least number of questions required to be answered by the user to arrive at each machine operation weighted by the respective scores, and selecting the question having the lowest average number. The selected question is output and an answer is received from the user. In response to the input answer a machine operation is carried out and/or the stored scores for each of the plurality of machine operations is adjusted. At least one further selection of a next question is then carried out for output to the user using the adjusted stored scores. A set of data determined from at least one input answer may be stored identified by a bookmark so that it can be retrieved when the bookmark identifier is determined from an input answer.

61 Claims, 13 Drawing Sheets

U.S. PATENT DOCUMENTS

| | | | |
|---|---|---|---|
| 6,208,985 B1 | 3/2001 | Krehel | 707/3 |
| 6,236,990 B1 | 5/2001 | Geller et al. | 707/5 |
| 6,314,423 B1* | 11/2001 | Himmel et al. | 707/10 |
| 6,370,238 B1* | 4/2002 | Sansone et al. | 379/88.23 |
| 6,560,576 B1* | 5/2003 | Cohen et al. | 704/270 |
| 6,832,350 B1* | 12/2004 | Bates et al. | 715/501.1 |

FOREIGN PATENT DOCUMENTS

| | | |
|---|---|---|
| WO | 00/004726 | 1/2000 |

OTHER PUBLICATIONS

Dauncey, E. A., et al., Computerized Identification System for Medical Professions and the General Public, *Poisonous Plants and Fungi in Britain: Animal and Human Poisoning* (1998), pp. 277-281.

Dauncey, E. et al., "Plant Identification for Medical Professionals: A Computerized Solution", *Seminars in Dermatology*, vol. 15, No. 2 (Jun.), 1996, pp. 124-230.

Hansen, M., "Identification of Plants", vol. 15, No. 2 (Jun. 1996) pp. 122-123.

J. Chu-Carroll, et al., "Vector-Based Natural Language Call Routing, " Computational Linguistics (1999); pp. 1-24.

Dauncey, E., et al., "A Computerized Identification System for Poisonous Plants and Fungi", *Unlocking the Future: Information Technology in Plant Pathology*, University of Kent, Canterbury (Dec. 16-19, 1996).

* cited by examiner

A QUESTION DATA STRUCTURE

| | |
|---|---|
| QUESTION NUMBER : | 10 |
| QUESTION DATA TO BE OUTPUT: | QUESTION 10.WAV |
| ANSWERS: | |
| YES: | POP MUSIC, ROCK MUSIC |
| NO: | REJECT RECORDS: 18, 22, 36 |
| TOPIC: | MUSIC |

*FIG. 7A*

A "FINAL" QUESTION DATA STRUCTURE

| | |
|---|---|
| QUESTION NUMBER : | 15 |
| QUESTION DATA TO BE OUTPUT: | QUESTION 15.WAV |
| ANSWERS: | |
| YES: | SET SELECTED RECORD IDENTIFIER TO RECORD NO. 20 |
| NO: | SET REJECTED RECORD IDENTIFIER TO RECORD NO. 20 |
| TOPIC: | POP MUSIC |

*FIG. 7B*

MACHINE INTERFACE

BACKGROUND OF THE INVENTION

The present invention generally relates to a machine interface to allow a user to select a machine operation from amongst a plurality of possible machine operations.

A great deal of effort has been expended in the prior art in order to solve the problem of how to interface a machine to a user to enable a user to more readily control the functioning of a machine.

When there are a plurality of possible machine operations which can be carried out and a user cannot uniquely and immediately identify the operation which the user requires to be carried out, it becomes a problem as to how to interface the machine to the user to enable a machine to quickly and efficiently select a desired machine operation. For example, when accessing a database which contains retrievable information, a user may not know the exact identity of the data which is required, e.g., the file name of a picture or a document. The problem is thus how to interact with the user to extract the necessary information to identify a required record.

This problem is also applicable to directing incoming calls in a call centre. In such a system, a user wishes for a call to be routed to a particular destination but that destination is not known. Thus in order to arrive at the target destination, a user must be prompted to input information. This is typically achieved by asking questions of the user in order to extract the necessary information.

A solution to this problem is disclosed in a paper entitled "A Vector-Based Natural Language Call Routing" by J. Chu-Carroll and B. Carpenter (Computational Linguistics 1999). The solution described in this paper is to receive a query from a user and to calculate and compare a vector for the query with vectors for the nearest documents. If there is uncertainty about the nearest document vector, a new vector is generated which would help to distinguish the nearest document. This vector is then used to generate a further question. The limitation of this system is that the confirming question only allows retrieval terms to be explicitly confirmed or rejected by the user.

In a machine interface which uses such a dialogue between a machine and a user, the user may often require to access the same machine operation, e.g., the same database record, or have the call directed to the same location. However, in order to return to the same point in a dialogue between the machine and the user, it is necessary for the user to repeat the dialogue. This can be a tedious operation for the user.

SUMMARY OF THE INVENTION

One aspect of the present invention therefore overcomes the problem of the prior art of interfacing a machine to a user wherein a dialogue is entered into between the machine and the user in order to extract information from the user to identify a machine operation which the user wishes to implement. In accordance with the present invention a position in the dialogue between the user and the machine can be bookmarked either automatically or manually by the user. The bookmark comprises a bookmark identifier which identifies a set of data which has been arrived at a point in the dialogue between the user and the machine. The term bookmark refers to any machine readable label, flag, marker or identifier.

In one embodiment, the bookmarking can take place automatically when a machine operation is executed after selection by the user. The bookmark comprises a set of data derived from an initial input from the user. The machine operation which was finally selected starting from the initial user input is linked to a set of data derived from the initial user input so that when the user once again generates a similar initial user input the user can immediately cause the desired machine operation to be executed.

In one embodiment, scores for each of the machine operations is stored, where the scores indicate the likelihood that the user will select a corresponding machine operation. Also, scores for the or each keyword for each machine operation are stored, where the scores indicate the likelihood that a user wishes to select a machine operation having caused a keyword to be input. When a user generates an input, keywords are determined using the input and these are used to look up corresponding scores which are then used to adjust the scores for the machine operations. The adjusted scores for the machine operations are then used to identify a machine operation to be executed. The scores for the keywords are also adjusted using the bookmark identifier.

In an alternative embodiment of the present invention, the user can manually enter a bookmark at an appropriate position in the dialogue with the machine. The manual bookmarking operation includes the inputting of a bookmark instruction and a bookmark identifier. In response to the bookmark instruction, the current set of data determined from the dialogue is stored identified by the bookmark identifier.

In an embodiment of the present invention, the set of data can comprise keywords which can be used to look up scores for the keywords for each machine operation in order to modify stored scores for machine operations. Alternatively, the set of data can comprise a set of scores for the machine operations as modified following the input of the keywords. Either of these will result in a return to a position in the dialogue between the machine and the user marked by the bookmark.

In another embodiment of the present invention, the set of data comprises pieces of input information. When the number of pieces of input information match the required number, an appropriate machine operation can then be executed.

In the dialogue between the user and the machine, the questions output to the user in order to extract information from the user can be determined based upon previous answers received from the user. Alternatively, the next question to be output to the user can simply be selected from a list of questions.

In the present invention, the machine operation can comprise any operation which can be carried out by a machine such as the retrieval of data, e.g., text, audio, video and images, or the execution of an instruction such as the routing of incoming calls in a call centre, the printing of a document, or the transmission of a facsimile. Thus a machine operation can comprise any event which a user wishes to take place.

In an embodiment of the present invention, the plurality of questions for output to the user are stored questions which comprise a library of questions aimed at extracting a response from the user which will enable the system to uniquely identify the machine operation which a user wishes to select. The stored questions can thus be tailored to provide the most efficient selection of machine operations.

In an embodiment of the present invention, the stored questions include expected answers. Any specified answer can have associated with it an identifier for a corresponding machine operation which is to be carried out in response to the input of the specified answer. Thus, each machine operation can have associated with it a "final" question which will allow the unique identification of the machine operation as the selected machine operation. The expected answers can have keywords associated therewith to allow for keyword matching with keywords for the target machine operations. Alternatively, instructions can be stored in association with the expected answers to extract keywords from the questions.

In another embodiment of the present invention, a machine operation is carried out in response to an answer when the score for the machine operation is significantly different from the scores for other machine operations: thus indicating the unique identification of the machine operation. For example, the score for a machine operation may be required to reach a threshold level greater than the other scores by a threshold amount.

One aspect of the present invention provides a machine interface for a machine which allows a user to select a machine operation. The machine operation can comprise any operations which can be carried out by machine such as the retrieval of data e.g. text, audio, video and images, or the execution of an instruction such as the routing of incoming calls in a call centre, the printing of a document, or the transmission of a facsimile. Thus a machine operation can comprise any event which a user wishes to take place.

In the present invention a plurality of questions for output to a user are stored. This library of questions comprises a set of questions which aim to extract a response from the user which will enable the system to uniquely identify the machine operation which a user wishes to select. The stored questions can thus be tailored to provide the most efficient selection of machine operations. This flexibility allows for a system administrator to modify the database of questions as desired.

A score is stored for each of a plurality of machine operations. The score indicates the likelihood that the user will select a corresponding machine operation.

A question for output to a user is selected from the stored questions by determining, for each of a plurality of said questions, an average of the least number of questions required to be answered by a user to arrive at each machine operation. The average is a weighted average which is weighted by the respective scores for the machine operations. The question having the lowest average number of questions is then selected as the next question to be output to the user. Thus this question selection process identifies a question which is likely to most quickly result in the selection of a machine operation.

The selected question is then output to the user and an input answer is received in response. In response to a received input answer, a machine operation can be carried out. Alternatively or in addition, the scores for each of the stored plurality of machine operations are adjusted and a selection of a further question takes place using the adjusted scores. This process will repeat until the score for a particular machine operation leads the question selection process to ask the user a question which enables a machine operation to be identified as the desired machine operation to be selected.

The present invention thus comprises a machine interface which uses a plurality of questions to identify a desired machine operation. Questions to be asked of a user are adaptively selected based on previous inputs by a user.

The advantage of the present invention is flexibility in the design since the number and type of questions can be tailored as required, which leads to more natural focussed and effective interaction with the user.

In an embodiment of the present invention, the stored questions include expected answers. Any specified answer can have associated with it an identifier for a corresponding machine operation which is to be carried out in response to the input of the specified answer. Thus, each machine operation will have associated with it a "final" question which will allow the unique identification of the machine operation as the selected machine operation.

In an alternative embodiment, a machine operation is carried out in response to an answer when the score for the machine operation is significantly different from the scores for other machine operations: thus indicating the unique identification of the machine operation. For example, the score for a machine operation may be required to reach a threshold level greater than the other scores by a threshold amount.

In one embodiment of the present invention, where expected answers to the questions are stored, question selection takes place using the determination of the least number of questions by predicting the expected answers input by a user to select each of the machine operations.

In an embodiment of the present invention, keywords are stored for each of the machine operations and keywords are determined using the input answer from the user. The system responds to the input answer by matching the determined keywords to the stored keywords and adjusting the scores for each of the plurality of machine operations in dependence on the matching. Preferably, scores for the keywords for each of the plurality of machine operations are stored with the keywords. Scores for the keywords determined from the input answers can then be determined for each of the plurality of machine operations by matching the determined keywords to the stored keywords. The scores of each of the plurality of machine operations are then adjusted using the determined scores for the keywords.

Thus in the embodiment of the present invention, the questions asked of the user are used to extract the necessary keywords from the user in order to be able to perform a keyword search to identify a desired machine operation.

The keywords need not be input by the user. The keywords can be stored in association with the expected answers to at least some of the questions. For example, a user may be asked the question 'Do you want music?' and the expected answer would be "yes" or "no". The user has not entered keywords, but the keyword 'music' can be stored in association with the expected answer "yes". This keyword can then be used for searching.

In an alternative embodiment, instead of storing keywords in association with the expected answers, instructions can be stored for the extraction of the keywords from the question.

The algorithm performed to determine the next question to ask a user is a recursive process in which sequences of questions to reach each machine operation are processed in order to identify the shortest path to each machine operation from each question. However, this recursive algorithm requires evaluation for all questions and for all machine operations.

In a preferred embodiment, in order to reduce the processing, only machine operations having the highest scores are used in the recursive process.

In another embodiment of the present invention, in order to reduce processing, the path length, i.e., the number of questions in a sequence, is only allowed to reach a threshold length. Processing is not carried on above a threshold question sequence length.

In a further embodiment of the present invention, the recursive process is only performed for questions, the answers to which will cause the scores of a most likely machine operation to increase.

In yet another embodiment of the present invention, in order to reduce the number of questions in the recursive process, questions can be preselected. Questions can be preselected on the basis of three criteria:
(i) by taking the score of the machine instruction having the highest score after asking the question and predicting a received answer;
(ii) by assigning a high score to questions relating to the same topic as a previous input answer; and
(iii) by assigning a high score to questions relating to the same topic as any previous input answers.

In a preferred embodiment, questions are preselected on the basis of a weighted average of all three of these techniques.

In one embodiment of the present invention, the system is able to indicate to a user when it is operating with a high degree of uncertainty, e.g., when no machine operations have distinctive scores. In order to do this, scores for hierarchical classifications of the machine operations are stored, where each hierarchical classification comprises a topic to which the machine operations in the hierarchy below relate and each hierarchical classification has a score comprising the sum of the scores for the machine operations in the hierarchy below. When the score for any of the hierarchical classifications at a predetermined level of hierarchical classification is below a threshold, the system can indicate uncertainty to the user. This indication can help a user to more carefully input a query (an answer to a question) which will more quickly result in the selection of a machine operation.

In order to allow a user to change the direction in which a search for a desired machine operation is being carried out, in an embodiment of the present invention, scores for each of the machine operations which is stored are decayed by a predetermined amount after each question has been answered. Thus, if a user changes the subject of their queries, the change in the score brought about by previous queries will gradually decay thereby allowing a user's more recent answers to predominate in the search for the desired machine operation.

A feature of the present invention is the facility to enable the questions to be added to and updated. Also, keywords used in an embodiment of the present invention can be added to and updated as well as their scores.

The present invention is particularly suited to a dialogue system in which a dialogue is entered into between a user and a machine in order to achieve the implementation of the machine operation. The present invention is particularly suited, although not limited to, implementation in a spoken dialogue system in which the questions are generated as a speech input and the answers are received as speech and processed by a speech recognizer.

The present invention can be implemented by dedicated hardware or by a suitably programmed processing apparatus, e.g., a programmed general purpose computer. The present invention thus encompasses computer program code for controlling a processor in a machine, e.g., in a computer, to carry out the method. The present invention thus encompasses providing the computer code to the processing apparatus in any conventional form, such as: as a signal, e.g., an electrical signal carried over a communications network such as the Internet, or on a storage medium such as a floppy disk, CD ROM, magnetic tape, or solid state memory device. The computer program code can be provided on any suitable carrier medium to the processing apparatus to be loaded in the processing apparatus to implement the method.

BRIEF DESCRIPTION OF THE FIGURES

Embodiments of the present invention will now be described with reference to the accompanying drawings, in which:

FIG. 7A is a schematic illustration of a question data structure;

FIG. 7B is a schematic illustration of a "final" question data structure.

DETAILED DESCRIPTION OF THE PREFERRED EMBODIMENTS

A first embodiment of the present invention will now be described with reference to FIGS. 1 to 3.

This first embodiment of the present invention comprises a manual bookmarking system wherein a user who enters into a dialogue with a machine is able to manually bookmark the position in the dialogue to enable the user to return to that position in the dialogue simply by inputting the bookmark.

Figure 1:
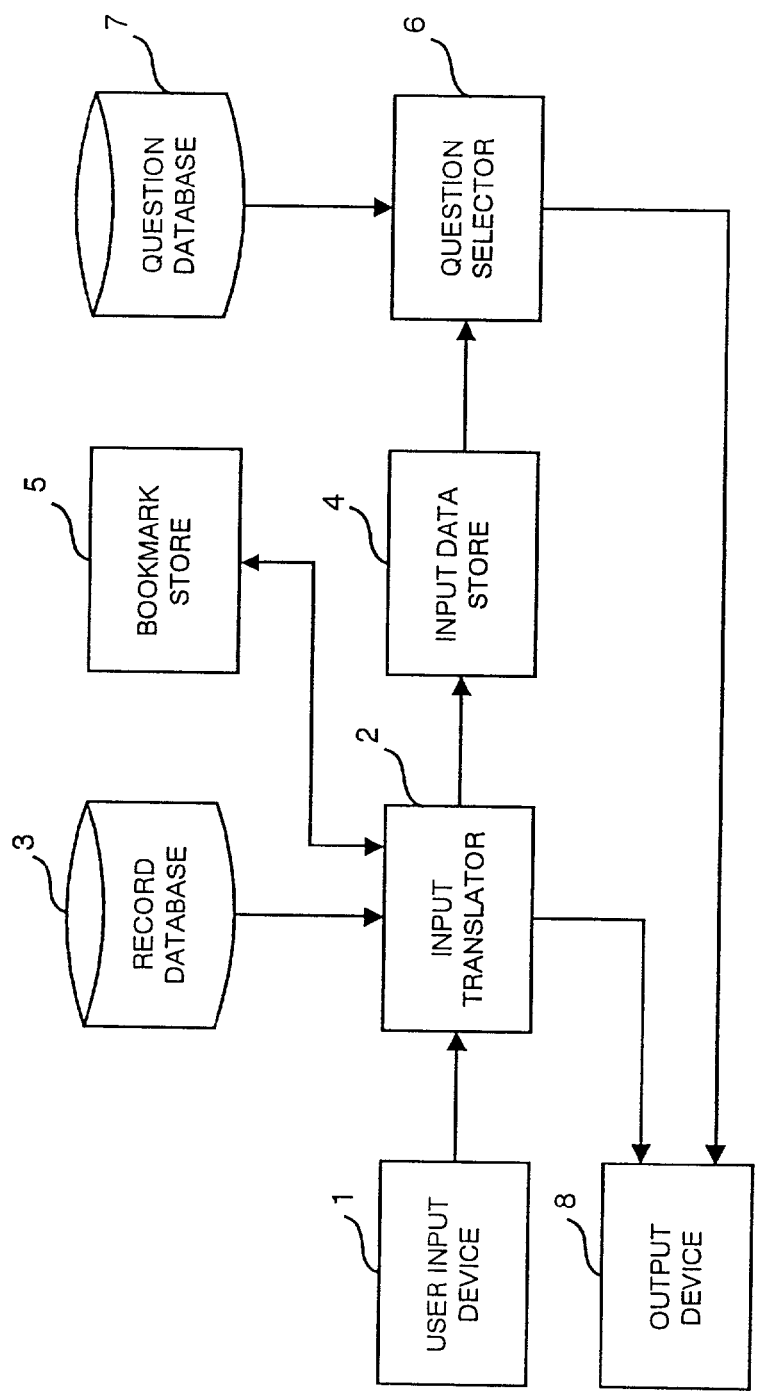
FIG. 1 is a schematic diagram of a first embodiment of the present invention.

FIG. 1 illustrates schematically this first embodiment of the present invention. The user is able to answer questions and enter bookmark information using the user input device 1. All input data comprising answers to questions and bookmark information is received by an input translator 2. The input translator 2 translates the input data either into input data to be stored in the data structure which is stored in an input data store 4, or identifies uniquely a record which can then be retrieved from a record database 3 and output on an output device 8. Also, the input translator 2 recognises an input bookmark instruction and stores the current data structure in the bookmark store 5. Further, the input translator 2 recognises a request for retrieval of bookmark data and accesses the stored data structure in the bookmark store 5. This retrieved data structure may enable the input translator 2 to immediately retrieve a record from the record database 3 for output by the output device 8. Alternatively, the retrieved data structure from the bookmark store 5 may simply be input into the input data store 4 in combination with any data structure already formed from input data.

Data within the input data store 4 is used by a question selector 6 in order to select a question from a question database 7 to be output by the output device 8. Thus in this embodiment, questions which are output to a user in order to prompt the user to input more data are selected based on previous input data by the user.

Figure 2:
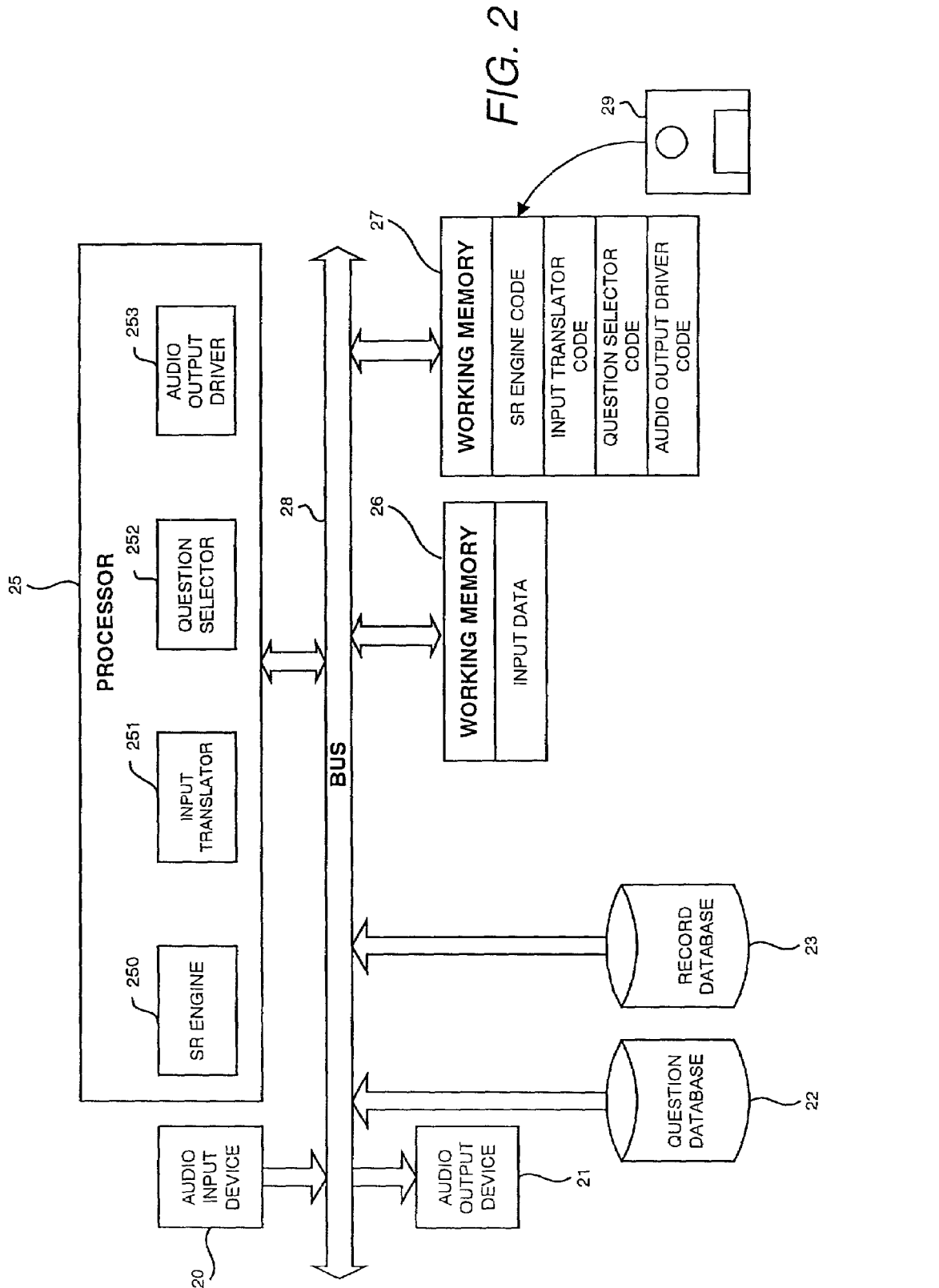
FIG. 2 is a schematic diagram of an implementation of the first embodiment of the present invention on a general purpose computer.
Figure 3:
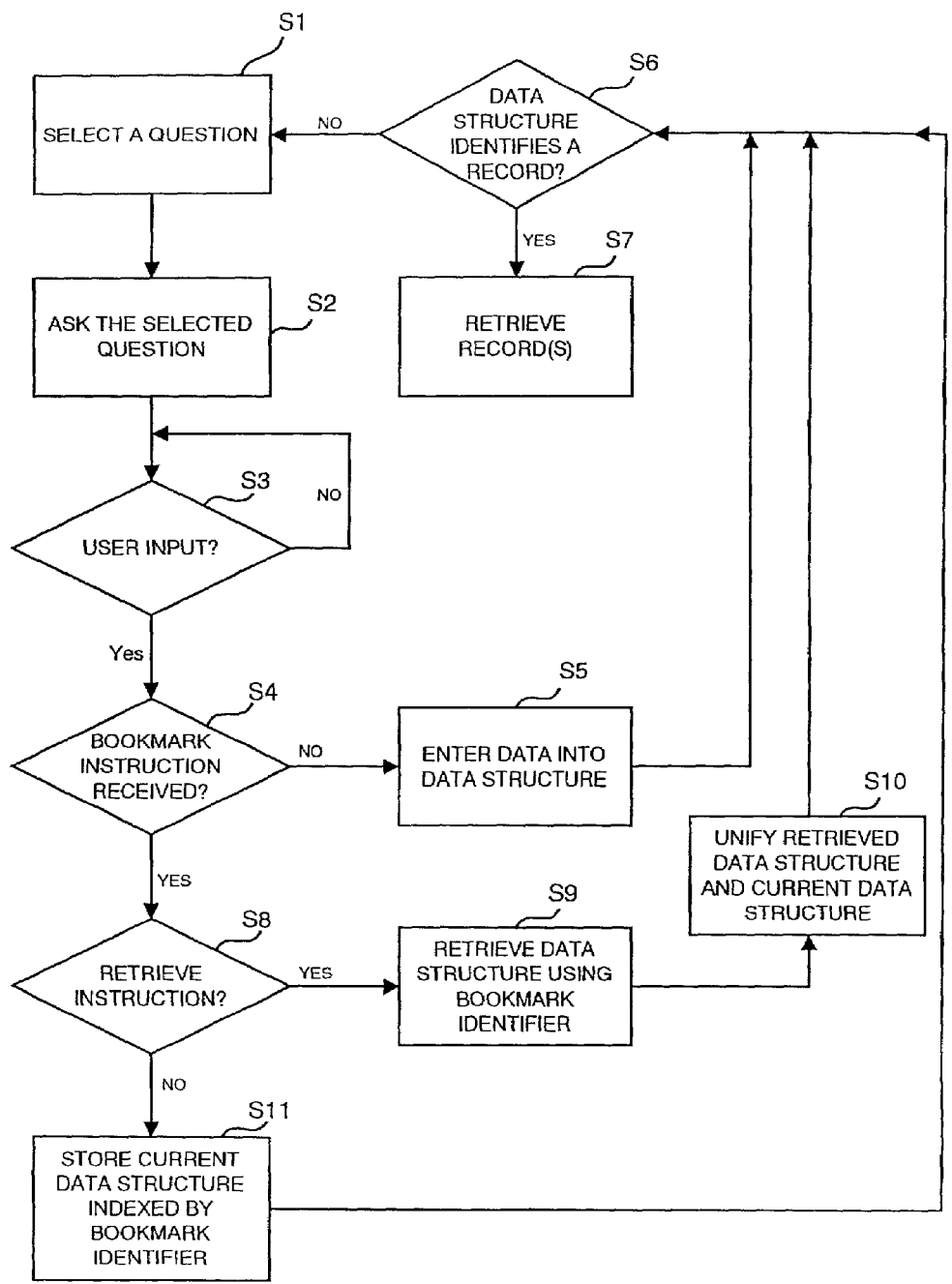
FIG. 3 is a flow diagram illustrating the method of the first embodiment of the present invention.

FIG. 2 illustrates the implementation of this embodiment of the present invention on a general purpose computer.

The computer includes an audio input device 20 such as a microphone and suitable analogue-to-digital conversion means in order to input spoken words into the computer. An audio output device 21, such as a loudspeaker, and suitable digital-to-analogue means is provided to generate spoken words comprising questions or output audio data records to a user.

A question database 22 and a record database 23 are provided stored in conventional non-volatile memory means such as a hard disk drive, CD ROM, floppy disk drive or solid state device. A working memory 26 is provided to store data used during the implementation of the system. A program memory 27 is also provided to store the computer program code for the implementation of the system. The working memory 26 and the program memory 27 can be provided on any conventional volatile or non-volatile memory means, e.g., hard disk drive, CD ROM, floppy disk drive or solid state device. The computer program code can be provided to the program memory 27 using any conventional carrier medium. In FIG. 2 a floppy disk drive 29 is illustrated. However, any other carrier medium such as a carrier signal, e.g. an electrical signal on the Internet, or any type of storage medium, e.g., CD ROM, tape device or solid state device can be used.

A processor 25 is provided and comprises the conventional CPU of a general purpose computer. The processor 25 implements various functions by loading and running computer program code stored in the program memory 27. In the present embodiment, the processor 25 implements a speech recognition engine 250 by loading and implementing speech recognition engine code from the program memory 27. This enables the audio input received from the audio input device 20 to be converted into text. The processor 25 also implements an input translator 251 by loading and implementing input translator code from the program memory 27. The input translator receives the output of the speech recognition engine 250.

The processor 25 further implements a question selector 252 by loading and implementing question selector code from the program memory 27. Also the processor 25 implements an audio output driver 253 by loading and implementing audio output driver code from the program memory 27. The audio output driver 253 can cause the retrieval of audio data as the selected record from the record database 25 by the audio output device 21. In an alternative arrangement, the audio output driver 253 can include text-to-speech synthesiser if the records in the record database 23 comprise text. The text-to-speech synthesiser of the audio output driver 253 can then convert the text to speech data for output by the audio output device 21.

The operation of the system will now be described with reference to the flow diagram of FIG. 3.

In step S1 a question is selected for output to the user. In step S2 the selected question is output to the user and in step S3 the machine waits for a user input. When a user input is received, in step S4, the input translator 2 determines whether a bookmark instruction has been received. If not, in step S5 the input translator 2 enters the data and determines in step S6 whether the data structure is sufficient to identify a record. If the data structure does identify a record, in step S7 the record is retrieved from the record database 3 and output to the output device 8. In the implementation illustrated in FIG. 2, the record retrieved comprises either an audio file or text which is converted to audio for output by the audio output device 21.

If in step S6 the input translator 2 determines that the data structure does not identify a record, in step S1 the question selector 6 selects another question for output to the user.

If in step S4 it is determined by the input translator 2 that a bookmark instruction is received, in step S8 it is determined whether a bookmark retrieval instruction has been received. If the instruction is not a retrieval instruction, in step S11 the input translator 2 determines that a bookmark store instruction has been received and thus the current data structure is stored in the bookmark store 5 indexed by the bookmark identifier specified by the user. The process then returns to step S6 to determine whether the data structure identifies a record.

If in step S8 it is determined that the bookmark instruction received comprises a retrieval instruction, the input translator 2 in step S9 retrieves bookmarked data from the bookmark store 5 using the bookmarked identifier associated with the retrieval instruction. The retrieved data structure is then unified with any data in the current data structure in step S10 by the input translator 2 by reading data from the input data store 4 and the process returns to step S6 to determine whether the data structure identifies a record.

In this embodiment of the present invention, a user is able to manually request the bookmarking of a position in a dialogue with a machine such that a user can return to that position in the dialogue simply by inputting a bookmark retrieval instruction with an associated bookmark identifier.

In this embodiment of the present invention, the input data can either be taken directly from the data input by the user, or from the question in association with the response by the user. Each expected response can have input data associated with it or the identity of a record which is to be accessed. Thus when an expected answer is received, this can either result in the generation of input data for the selection of the next question, or it can result in the identification of a record for output.

Alternatively, the data structure can be built up by receiving input pieces of information from the user input device 1. The input translator 2 will thus continue to fill the data structure with pieces of information received until the data structure is complete. The complete data structure will then identify a record which can be retrieved for output.

A second embodiment of the present invention will now be described with reference to FIGS. 4 to 8.

In the second embodiment of the present invention, the system automatically generates bookmarks from an initial user input. When the user initially inputs data, keywords are extracted from this to be used as bookmarks for a record when this is finally identified and output. Thus the extracted keywords are used to increase scores for the keywords or to add scores for the keywords so that when a user next inputs data which includes the keywords, the probability of quickly identifying the record last identified by the keywords is improved.

Figure 4:
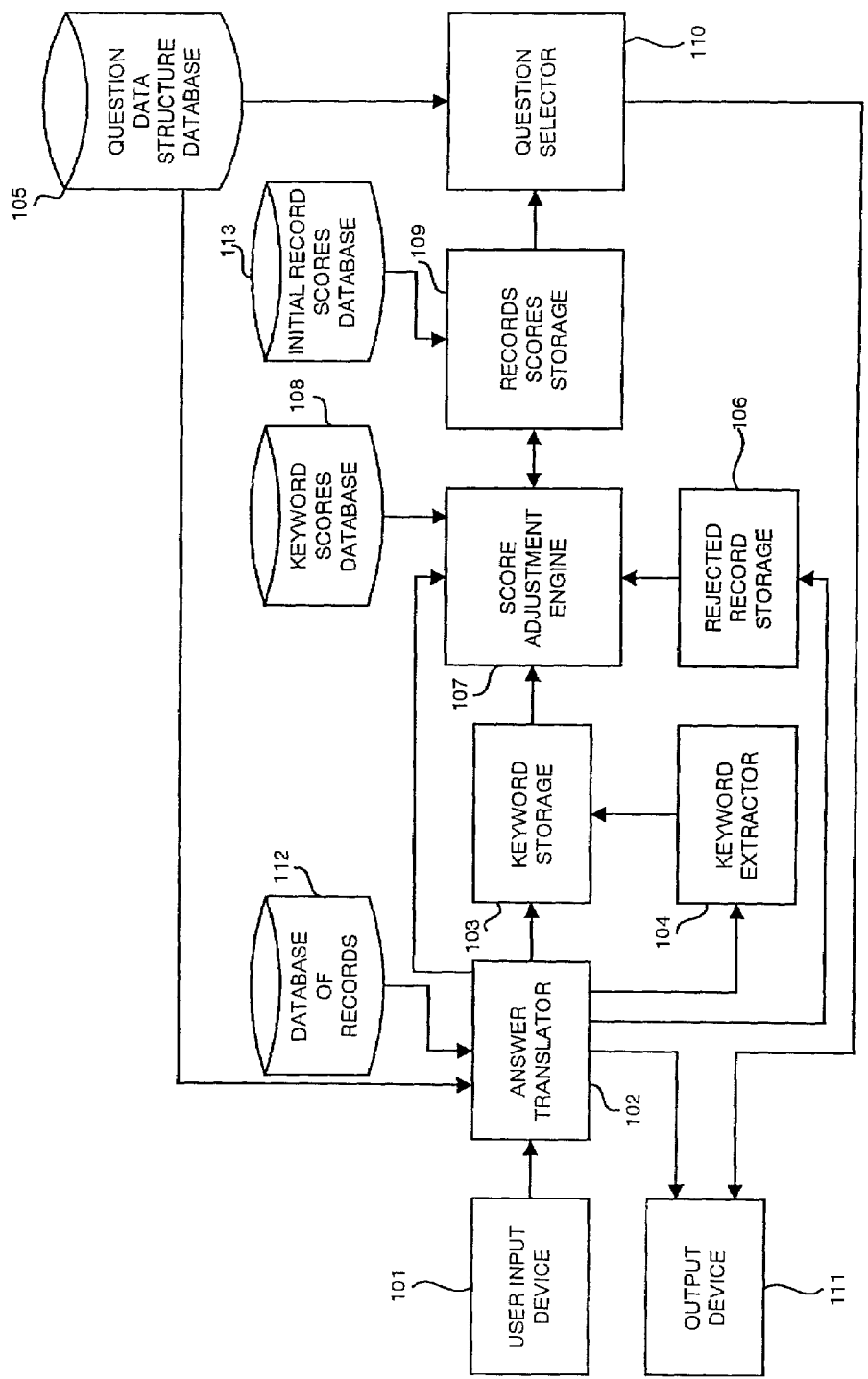
FIG. 4 is a schematic diagram of a second embodiment of the present invention.

FIG. 4 is a schematic illustration of the second embodiment of the present invention for accessing records in a database by receiving user input queries and answers to questions generated by the system in order to aid the identification of the desired record.

A user input device 101 receives user input. The user input device 101 will provide text based on the input to an answer translator 102 which interprets the answer by comparing the answer to expected answers to questions which are stored with the questions in a question data structure database 105. If the user input does not match the expected answers for a question which was asked, the user input is passed to a keyword extractor 104 to extract the keywords from the user input. The keywords are then stored in a keyword list storage device 103. If on the other hand the user input matches expected answers, this can result in the answer being translated to simply output a set of keywords associated with the expected answer to the keyword list storage device 103. If an answer which is matched to a user input indicates that the record should be rejected, the identity of the rejected record is stored in a rejected record storage device 106. If the user input matches an answer which has associated with it the identity of a record which is to be selected, i.e. the user input is sufficient to identify a record, the answer translator 102 will access the database for the records 112 in order to cause the record to be retrieved and output to an output device 111. Each record of the database 112 has a score stored in an initial record scores database 113. The score for each record indicates the likelihood that a user will wish to access the record. The initial scores can be used to identify popular records which are often accessed by users.

A keyword scores database 108 is provided which stores a score for keywords for each record. Thus, for example, for a keyword "book", scores for the keyword for records which have information on or relate to books will be high.

A score adjustment engine 107 is provided to read the keyword list from the keyword list storage device 103 and to identify if any records have been rejected by reading the rejected record storage device 106. If any records have been rejected, their score is set to zero indicating that the user does not wish to access these records.

The score adjustment engine 107 accesses the keyword scores database 108 using the keywords in the keyword list read from the keyword storage device 103 in order to determine keyword scores for records. The score adjustment engine 107 also accesses current scores for records from a record scores storage device 109. Initially, the current scores in the record scores storage device 109 can be set to the initial record scores from the initial record scores database 113. The score adjustment engine then adjusts the current scores for each record in dependence upon the scores determined for each keyword for each record. The adjusted score is then stored as the current score for each record in the record scores storage device 9.

The score adjustment engine 107 also receives initial keywords identified from an initial input from a user by the answer translator 102. The initial keywords are used as bookmarks in order to adjust the keyword scores for the records in the keyword scores database 108.

When a record has not been identified as a desired record as a result of a user input, the system requires more information to enable it to identify a desired record. This information is obtained by asking the user a next question retrieved from the question data structure database 105. The next question to be selected to be retrieved from the question data structure database 105 is determined by a question selector 110 which selects the question on the basis of the current scores for each record stored in the record scores storage device 109. Once a question has been selected by the question selector 110, it is retrieved from the question data structure database 105 and output to the output device 110.

Thus the embodiment of the present invention will continue to ask questions selected by the question selector 110 of the user in order to extract more keywords which will help to identify a desired record by adjusting the scores appropriately for the records.

Figure 5:
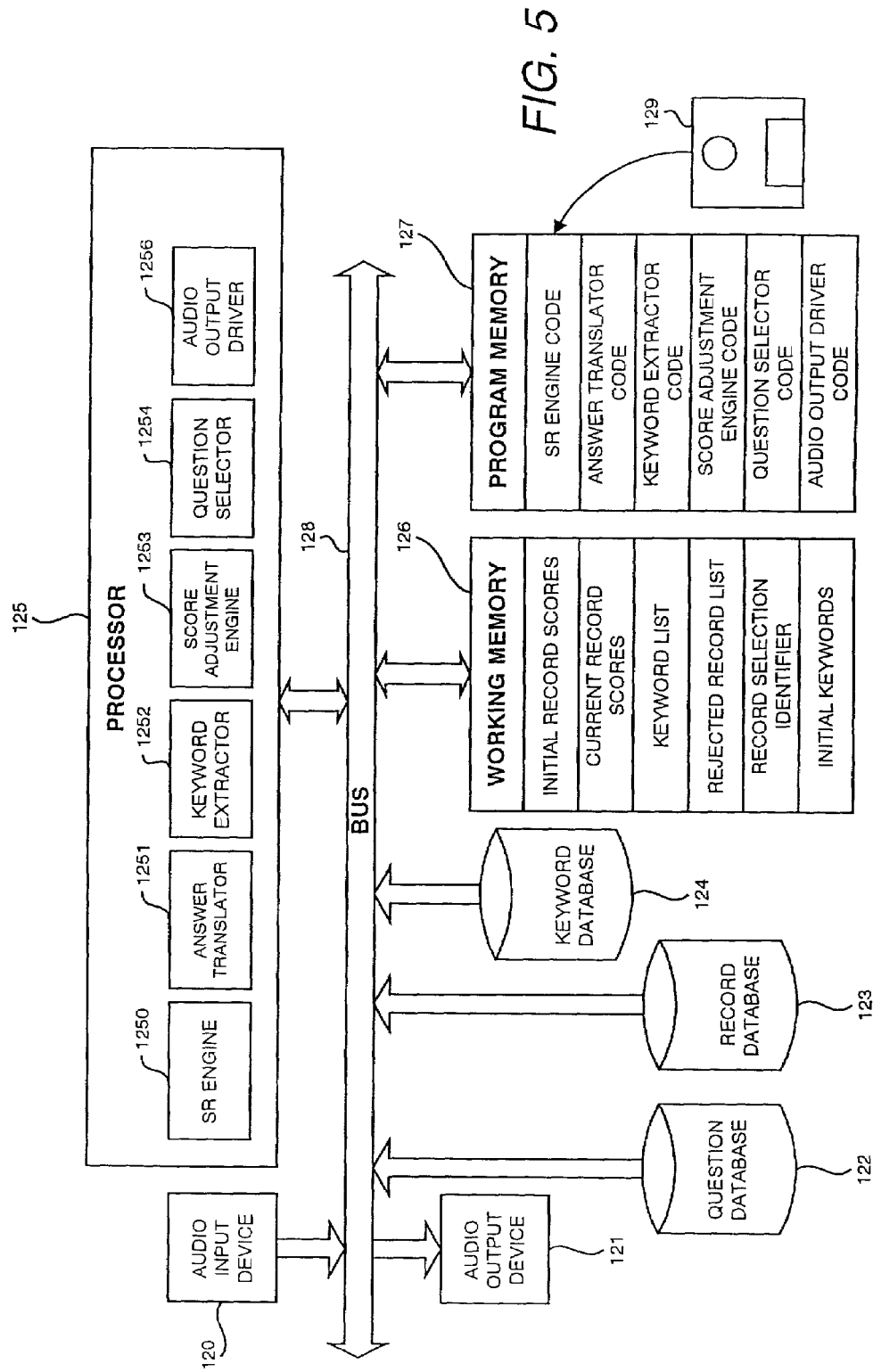
FIG. 5 is a schematic diagram of an implementation of the second embodiment of the present invention on a general purpose computer.

FIG. 5 is a schematic diagram of an implementation of the second embodiment of the present invention in a general purpose computer which interfaces to a user using speech.

The computer includes an audio input device 120 such as a microphone and suitable analogue-to-digital conversion means in order to input spoken words into the computer. An audio output device 121 such as a loudspeaker and suitable digital-to-analogue means is provided to generate spoken words comprising questions or output audio data records to a user.

A question database 122, a record database 123 and a keyword database 124 are provided stored in conventional non-volatile memory means such as a hard disk drive, CD ROM, floppy disk drive or solid state device. A working memory 126 is provided to store data used during the implementation of the system. A program memory 127 is also provided to store the computer program code for the implementation of the system. The working memory 126 and the program memory 127 can be provided on any conventional volatile or non-volatile memory means, e.g. hard disk drive, CD ROM, floppy disk drive, or solid state device. The computer program code can be provided to the program memory 127 using any conventional carrier medium. In FIG. 5 a floppy disk 129 is illustrated. However, any other carrier medium such as a carrier signal, e.g. an electrical signal carried over the Internet, or any type of storage medium, e.g. CD ROM, tape device, or solid state device can be used.

A processor 125 is provided and comprises the conventional CPU of a general purpose computer. The processor 125 implements various functions by loading and running computer program code stored in the program memory 127. In the present embodiment, the processor 125 implements a speech recognition engine 1250 by loading and implementing speech recognition engine code from the program memory 127. This enables the audio input received from the audio input device 120 to be converted into text. The processor 125 also implements an answer translator 1251 by loading and implementing answer translator code from the program memory 127. The answer translator 1251 receives the output of the speech recognition engine 1250.

The processor 125 further implements a keyword extractor 1252 by loading and implementing keyword extractor code from the program memory 127. Also the processor 125 implements a score adjustment engine 1253 by loading and implementing score adjustment engine code from the program memory 127. Further, the processor 125 implements a question selector 1254 by loading and implementing question selector code from the program memory 127. Also, the processor 125 implements an audio output driver 1256 by loading and implementing audio output driver code from the program memory 127. The audio output driver 1256 can cause the retrieval of audio data as the selected record from the record database 125 for output by the audio output device 121. In an alternative arrangement, the audio output driver 1256 can include a text-to-speech synthesiser if the records for the record database 123 comprise text. The text-to-speech synthesiser of the output audio driver 1256 can then convert the text-to-speech data for output by the audio output device 121.

The operation of the system will now be described.

The records of the database of this embodiment comprise audio files in the "wave" file format. Each record is identified by a record number to allow for ease of access.

The question data is formed into question data structures as illustrated in FIGS. 7A and 7B. Each question is identified by a question number. Associated with the question is a question prompt as an audio file in the "wave" format, e.g., in QUESTION10.WAV. Associated with each question are expected answers. In the embodiment illustrated in FIG. 7A, the expected answers are "yes" or "no". The question output in this example could be an audio question "Do you want pop music?". If the user answers "yes", associated with the expected answer "yes" are the keywords "pop music" and "rock music". If the user answers "no", associated with the expected answer "no" is an instruction to reject three records as not being records which will be desired by the user, i.e., records 18, 22 and 36. This list of rejected records is stored in the rejected record list. The question data structure also includes an indication of the topic of the question which in this case generally comprises the topic "music".

The question data structure illustrated in FIG. 7A comprises a question data structure which does not result in the selection of a record as a result of an answer. Instead, the answer will result in the rejection of some records and the input of keywords which can be used to adjust the scores for records which will then be used to select the next question to ask the user.

FIG. 7B illustrates another question data structure which is termed the "final" question data structure for a record. The question data structure is the same as that of FIG. 7A except in the example given, the question to be output to the user is of course a different audio file related to question number 15. Also the expected answers result in different operations. For example, the question could be "Do you want pop artist 1?", where record number 20 contains a piece of music by pop artist 1. If the answer to this question is "yes", in the question data structure there is an instruction to set the selected record identifier for record number 20. If on the other hand the answer is "no", the rejected record identifier is set to record number 20.

The other difference between the question data structure of FIG. 7A and the question data structure of FIG. 7B is that the topic is more narrowly defined as "pop music".

Figure 6:
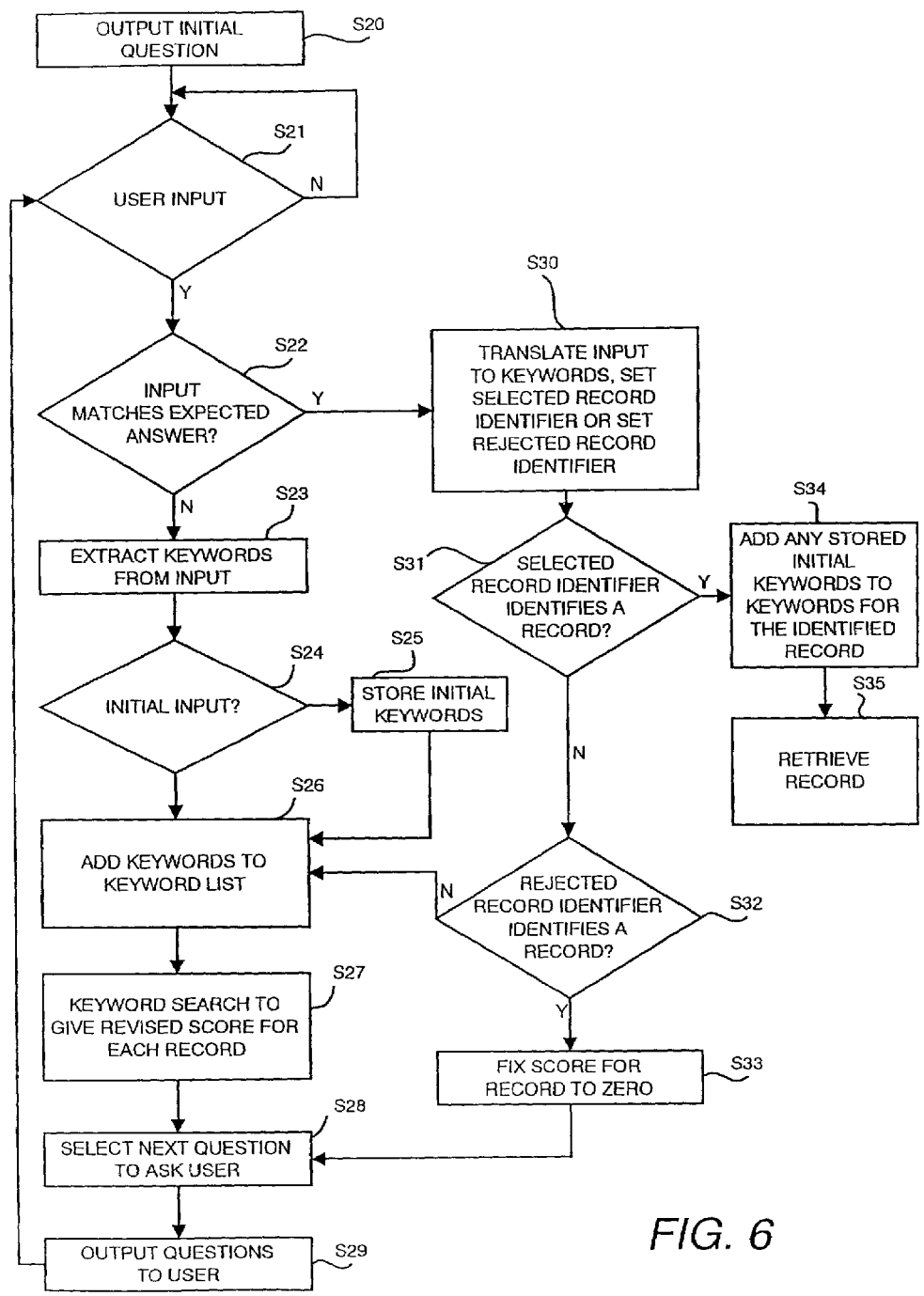
FIG. 6 is a flow diagram of the method of operation of the second embodiment of the present invention.

FIG. 6 is a flow diagram illustrating the operation of this embodiment of the present invention.

In step S20 an initial question is output to the user. This question can simply be an initial prompt, e.g., "What would you like?" and the scores for the records are set to the initial record scores. In step S21 the system awaits the user input and when this is received, in step S22, the answer translator determines whether the input matches an expected answer. If it does not, in step S24 keywords are extracted from the input. In step S24 it is then determined whether the input is an initial input. If so in step S25 keywords for the initial input are stored to act as bookmarks. Then in step S26 the keywords are added to the keyword list and in step S27 the keywords are used to search in the keyword database the scores for the words for each record. These scores are then used to determine a revised score for each record.

In step S28 a next question to ask the user is selected using the revised scores for each record. The selected question is then output in step S29 to the user and the process returns to step S21 to await the user input.

In this embodiment the initial scores for the records are set as an initial probability p(x). The scores for keywords stored comprises a probability of a word given a record p(w|x). The probability is thus updated by multiplying the current probability p(x) by the word probability p(w|x).

In order to take into account the possibility that a user changes the target record during the question and answer session, the current probability for records is allowed to decay back towards the initial probability. For example, the new probability can be calculated from:

$$p(x)=(0.2xp_i(x)+0.8xp(x))xp(w|x)$$

where $p_i(x)$ is the initial probability.

It can be seen that with a decay set by the numbers 0.2 and 0.8, the current probability can be made to decay towards the initial probability if the word probability does not modify the current probability.

If in step S22 the user's input does match an expected answer, the answer translator, in step S30, translates the input to keywords if the answer has keywords associated with it. Alternatively, if there is an instruction associated with an expected answer to set the selected record identifier to a record number or to set the rejected record identified to a record number, this is done. Then in step S31 it is determined whether the selected record identifier identifies a record. If not, in step S32 it is determined whether the rejected record identifier identifies a record. If not, this means that the answer translator has determined keywords associated with the answer and these are added to the keyword list in step S26 to be used in step S27 to revise the score for each record. The revised score can then be used in step S28 to select the next question to ask a user for output in step S29.

If in step S32 it is determined that there is a record identified by the rejected record identifier, in step S33 the score for the record is fixed to zero and the process to select the next question to ask a user in step S28 is carried out with the score for the record fixed to zero. If step S33 has been carried out a number of times, there can be a number of rejected records listed for which the scores are fixed to zero. These are listed in the rejected record list to ensure that their scores remain fixed at zero in the current scores used by the question selector to determine the next question to ask a user.

If in step S31 it is determined that a record is identified, in step S34 any initial keywords stored in step S25 are stored as keywords for the identified record. Then in step S35 the record is retrieved.

Thus in this embodiment of the present invention the keywords determined from an initial input from the user are used as bookmarks by adding the keywords to keywords for a record which was finally identified as the target record starting from the initial query from the user.

In this embodiment the keywords in the keyword database have probabilities associated with them. Thus in step S34, rather than simply adding keywords to the list, the probabilities for the keywords listed in the keyword database is modified.

For example, where the keyword does not appear in the keyword database, the keyword is added to the database with a high probability. If the keyword is already in the database, its probability is increased. Since probability is used in this embodiment for the words, and since all the probabilities must add up to 1.0, where keywords identified in step S25 have their probabilities increased, probabilities for other words must decrease. A set of probabilities for keywords can be stored as a bookmark to be used for the calculation of probabilities for records. The probabilities for records are themselves used to identify the record being sought by the user.

In this embodiment, any method of selecting a question can be used, e.g. simply by referring to the topics of the questions. Preferably, however, this embodiment of the present invention implements the technique for selecting the question disclosed in a copending UK application by the same assignee filed on 29 Mar. 2000, the contents of which are hereby incorporated by reference. The particular technique for selecting the next question is not an essential feature of the present invention. For example, the next question could simply be selected from a list of questions.

In the foregoing embodiments, probabilities have been described as usable with keywords for records. It is, however, also possible to bookmark not just the final records to be selected, but also any position in a dialogue. In one embodiment this can be achieved by a hierarchical set of questions so that the probability for the records can be formed into a hierarchical tree as illustrated in FIG. 8.

Figure 8:
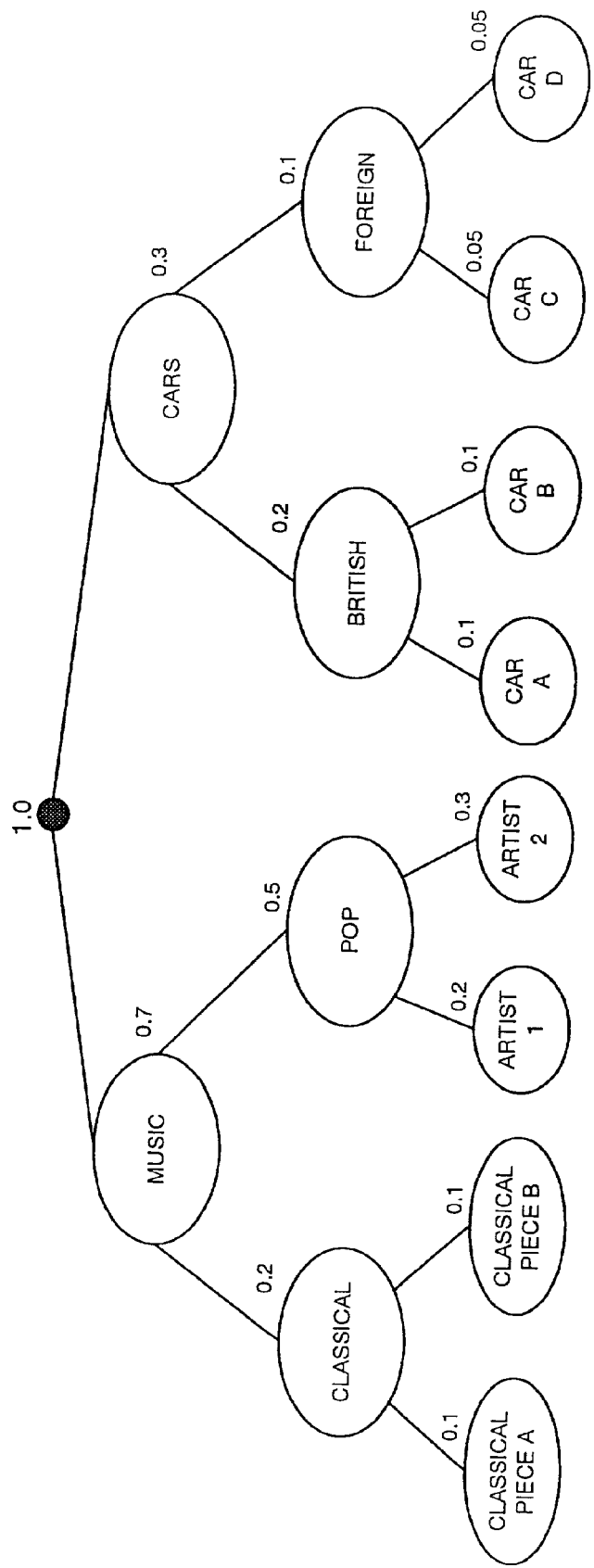
FIG. 8 is a schematic diagram of the hierarchical classifications of records in accordance with an embodiment of the present invention.

In FIG. 8 the numbers indicate probabilities for records, and classifications of records. The keywords "music" and "cars" can be used as a third hierarchical level and the keywords "classical", "pop", "British" and "foreign" can be used as keywords at a second hierarchical level of classification. Thus, for instance, after having reached the classification "pop", which identifies two possible records "artist 1" and "artist 2", a user may wish to bookmark this point of the dialogue, e.g. using the spoken word "jack". Thus the bookmark identifier "jack" will identify keywords which, in this example, can be the keywords "music" and "pop". These keywords will have probabilities associated with them which will result in the probabilities for the final records "artist 1" and "artist 2" being adjusted to 0.2 and 0.3 which is higher than the other records.

This enables a user to return to a point in the dialogue which could then result in a question being asked "Do you want artist 1 or artist 2?". Thus, this position in the dialogue is bookmarked without having to actually bookmark a record. This avoids the user having to reach a midpoint in a dialogue by repeating previous dialogue steps, e.g., answering the question "Do you want music or cars?" and "Do you want classical music or pop music?".

Figure 9:
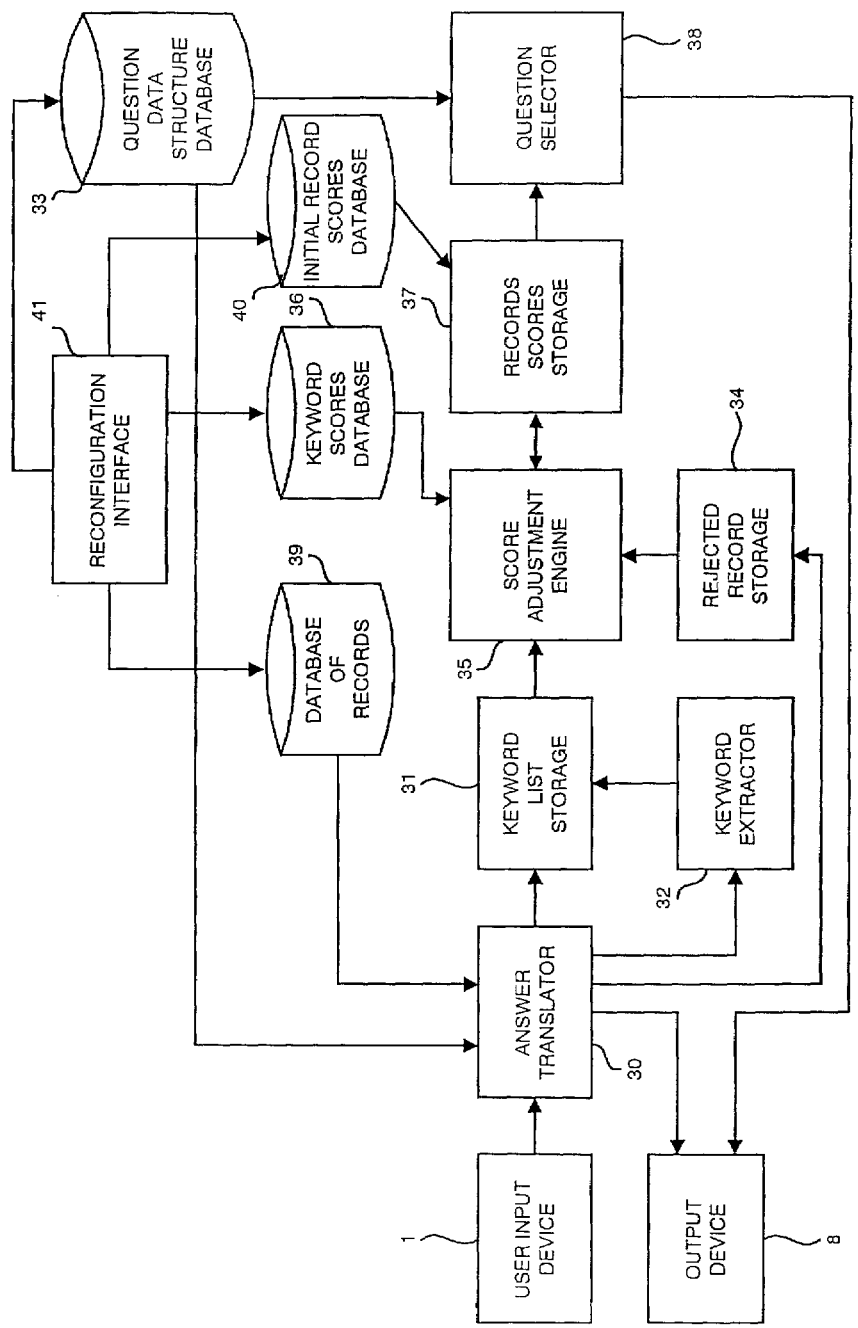
FIG. 9 is a schematic diagram of an embodiment of the present invention.

FIG. 9 is a schematic illustration of an embodiment of the present invention for accessing records in a database by receiving user input queries and answers to questions generated by the system in order to aid the identification of the desired record.

The user input device 1 receives user input. The input device will provide text based on the input to an answer translator 30 which interprets the answer by comparing the answer to expected answers to questions which are stored with the questions in a question data structure database 33. If the user input does not match the expected answers for a question which was asked, the user input is passed to a keyword extractor 32 to extract the keywords from the user input. The keywords are then stored in a keyword list storage device 31. If on the other hand the user input matches expected answers, this can result in the answer being translated to simply output a set of keywords associated with the expected answer to the keyword list storage device 31. If an answer which is matched to a user input indicates that the record should be rejected, the identity of the rejected record is stored in a rejected record storage device 34. If the user input matches an answer which has associated with it the identity of a record which is to be selected, i.e., the user input is sufficient to identify a record, the answer translator 30 will access a database for the records 39 in order to cause the record to be retrieved and output to an output device 8. Each record of the database 39 has a score stored in an initial record scores database 40. The score for each record indicates the likelihood that a user will wish to access the record. The initial scores can be used to identify popular records which are often accessed by users.

A keyword scores database 36 is provided which stores a score for keywords for each record. Thus, for example, for a keyword "book", scores for the keyword for records which have information or relate to books will be high.

A score adjustment engine 35 is provided to read the keyword list from the keyword list storage device 31 and to identify if any records have been rejected by reading the rejected records storage device 34. If any records have been rejected, their score is set to zero indicating that the user does not wish to access these records.

The score adjustment engine 35 accesses the keyword scores database 36 using the keywords in the keyword list read from the keyword storage device 31 in order to determine keyword scores for records. The score adjustment engine 35 also accesses current scores for records from a record scores storage device 37. Initially, the current scores in the record scores storage device 37 can be set to the initial record scores from the initial record scores database 40. The score adjustment engine 35 then adjusts the current scores for each record in dependence upon the scores determined for each keyword for each record. The adjusted score is then stored as the current score for each record in the record scores storage device 37.

When a record has not been identified as a desired record as a result of a user input, the system requires more information to enable it to identify a desired record. This information is obtained by asking the user a next question retrieved from the question data structure database 33. The next question to be selected to be retrieved from the question data structure database 33 is determined by a question selector 38 which selects the question on the basis of the current scores for each record stored in the record scores storage device 37. Once a question has been selected by the question selector 38, it is retrieved from the question data structure database 33 and output to the output device 8.

A re-configuration interface 41 is provided and allows for the adjustment of the initial scores for records in the initial record scores database 40. The scores for records can be adjusted to take into account changes in user behaviour, e.g., the popularity of particular records, or to add initial scores for records which have been added to the database of records 39.

The re-configuration interface 41 is also provided to allow an administrator or manager of the system to reconfigure any of the data in the databases 33, 36, 39 and 40. This provides a system with a great deal of flexibility since it allows the records which can be selected by a user to be updated. It also allows the questions to be updated as necessary either to improve the abilities of the system to identify a record, or to add new questions when new records are added to the database records 39. Also, the re-configuration interface 41 allows the keyword scores database 36 to be updated to take into account changes in user behaviour and changes in the records in the database of records 39.

Thus this embodiment of the present invention will continue to ask questions selected by the question selector 38 of the user in order to extract more keywords which will help to identify a desired record by adjusting the scores appropriately for the records.

Figure 10:
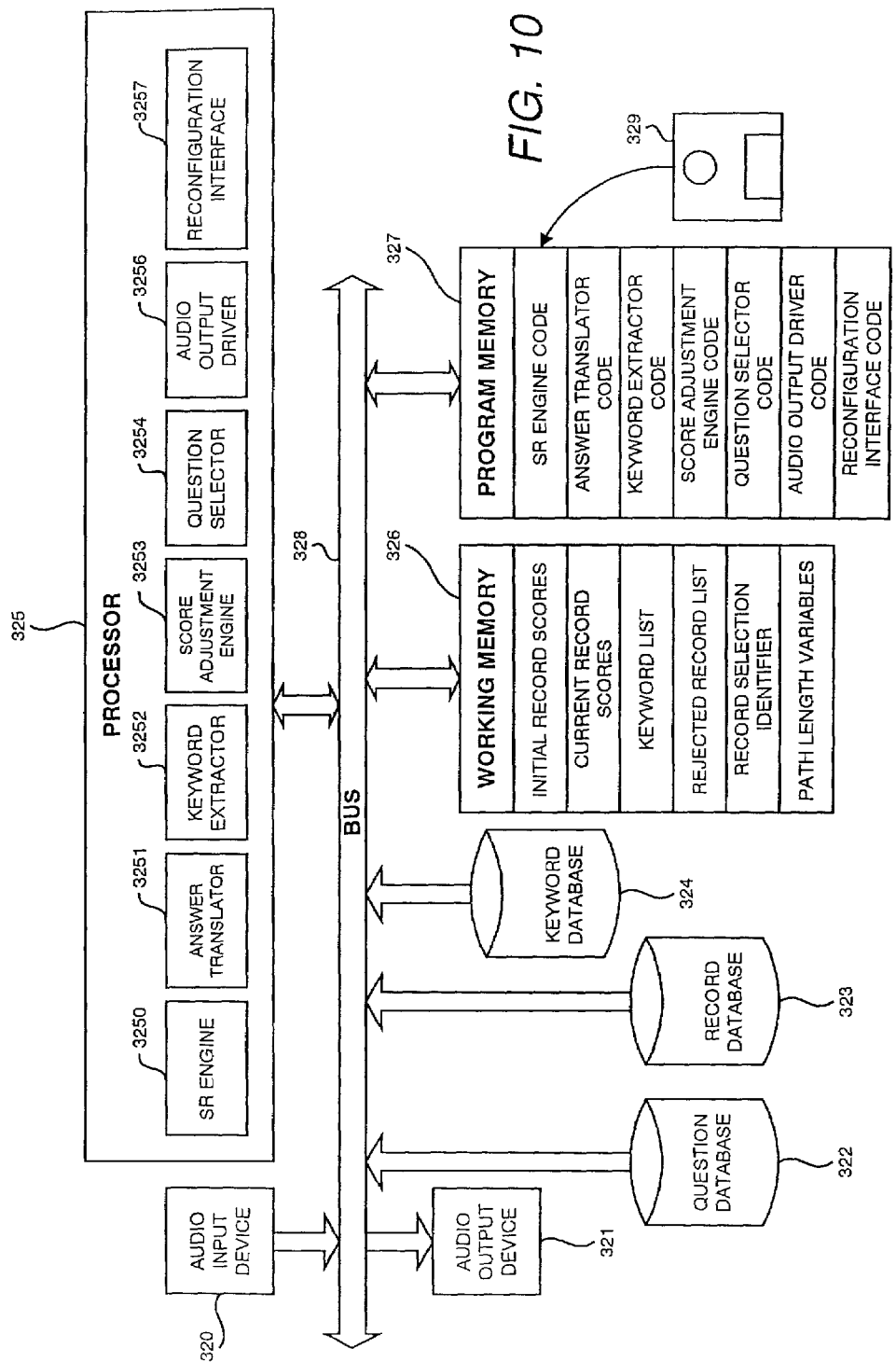
FIG. 10 is a schematic diagram of an implementation of an embodiment of the present invention on a general purpose computer.

FIG. 10 is a schematic diagram of an implementation of the system of FIG. 9 in a general purpose computer which interfaces to a user using speech.

The computer includes an audio input device 320 such as a microphone and suitable analogue to digital conversion means in order to input spoken words into the computer. An audio output device 321 such as a loudspeaker and suitable digital to analogue means is provided to generate spoken words comprising questions or output audio data records to a user.

A question database 322, a record database 323, and a keyword database 324 are provided stored in conventional non-volatile memory means such as a hard disc drive, CD ROM, floppy disc drive or solid state device. A working memory 326 is provided to store data used during the implementation of the system. A program memory 327 is also provided to store the computer program code for the implementation of the system. The working memory 326 and the program memory 327 can be provided on any conventional volatile or non-volatile memory means e.g. hard disc drive, CD ROM, floppy disc drive or solid state device. The computer program code can be provided to the program memory 327 using any conventional carrier medium. In FIG. 10 a floppy disc drive 329 is illustrated. However, any other carrier medium such a carrier signal e.g. an electrical signal on the Internet, or any type of storage medium e.g., CD ROM, tape device, or solid state device can be used.

A processor 325 is provided and comprises the conventional CPU of a general purpose computer. The processor 325 implements various functions by loading and running computer program code stored in the program memory 327. In the present embodiment, the processor 325 implements a speech recognition engine 3250 by loading and implementing speech recognition engine code from the program memory 327. This enables the audio input received from the audio input device 320 to be converted into text. The processor 325 also implements an answer translator 3251 by loading and implementing answer translator code from the program memory 327. The answer translator 3251 receives the output of the speech recognition engine 3250.

The processor 325 further implements a keyword extractor 3252 by loading and implementing keyword extractor code from the program memory 327. Also, the processor 325 implements a score adjustment engine 3253 by loading and implementing score adjustment engine code from the program memory 327. Further, the processor 325 implements a question selector 3254 by loading and implementing question selector code from the program memory 327. Also, the processor 325 implements an audio output driver 3256 by loading and implementing audio output driver code from the program memory 327. The audio output driver 3256 can cause the retrieval of audio data as the selected record from the record database 325 for output by the audio output device 321. In an alternative arrangement, the audio output driver 3256 can include a text to speech synthesiser if the records in the record database 323 comprise text. The text to speech synthesiser of the audio output driver 3256 can then convert the text to speech data for output by the audio output device 321.

The processor 325 also implements a re-configuration interface 3257 by loading and implementing configuration interface code from the program memory 327. The re-confirmation interface can be used for re-configurating the data in any of the databases 322, 323 and 324.

The operation of the system will now be described.

The records in the database in this embodiment also comprise audio files in the "wave" file format as described above with reference to FIGS. 7A and 7B.

Figure 11:
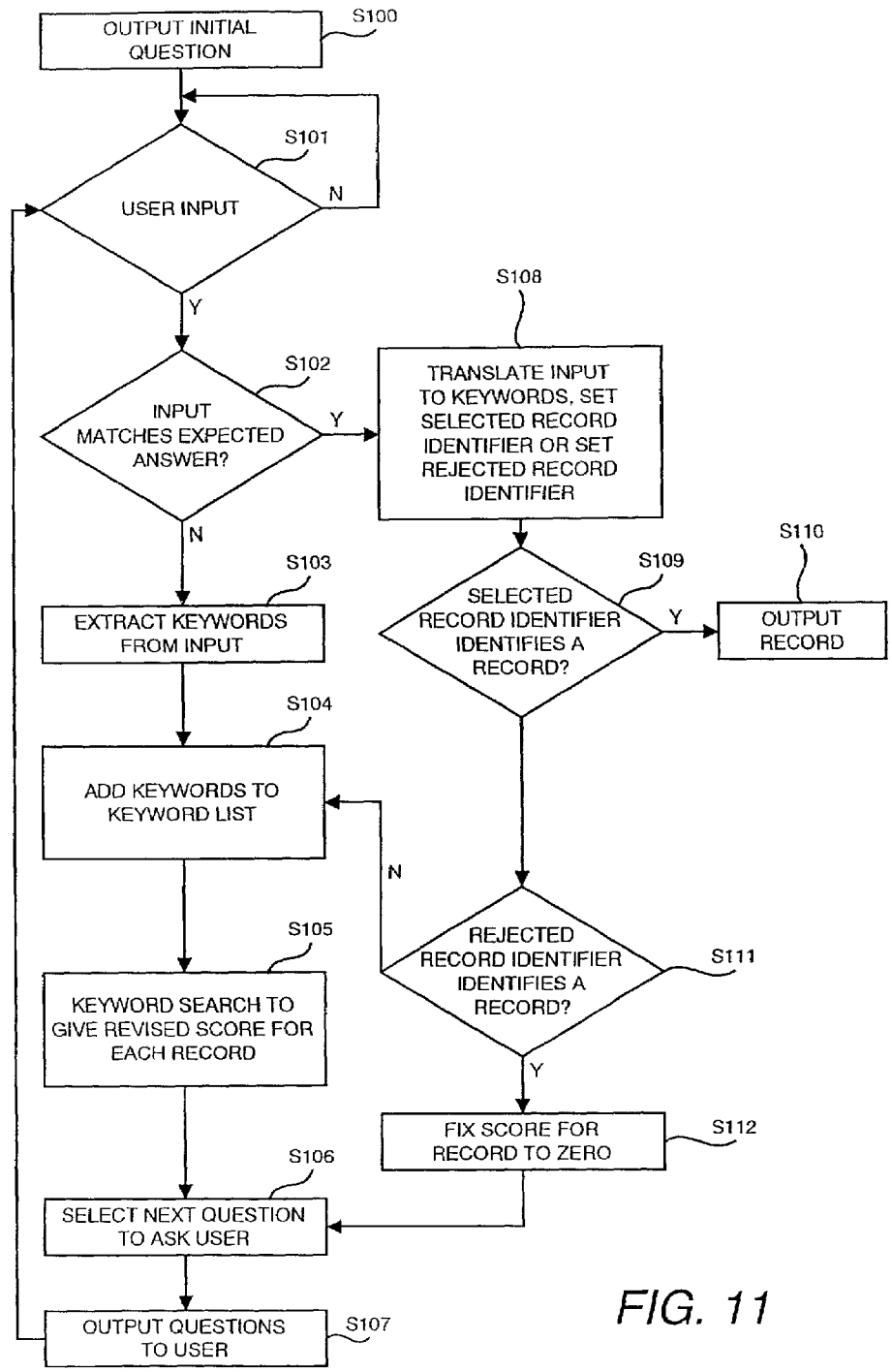
FIG. 11 is a flow diagram illustrating the method of accessing a record of the database in accordance with an embodiment of the present invention.

FIG. 11 is a flow diagram illustrating the operation of the system according to this embodiment of the present invention.

In step S100 an initial question is output to the user. This question can simply be an initial prompt, e.g., "What would you like?" and the scores for the records are set to the initial record scores. In step S101 the system awaits the user input and when this is received, in step S102, the answer translator determines whether the input matches an expected answer. If it does not, in step S103 keywords are extracted from the input and in step S104 the keywords are added to the keyword list. The keywords are then used in step S105 to search in the keyword database for scores for the words for each record. These scores are then used to determine a revised score for each record.

In step S106 a next question to ask a user is selected using the revised scores for each record. The selected question is then output in step S107 to the user and the process returns to step S101 to await a user input.

In this embodiment the initial scores for the records are set as an initial probability p(x). The scores for keywords stored comprises a probability of a word given a record p(w|x). The probability is thus updated by multiplying the current probability p(x) by the word probability p(w|x).

In order to take into account the possibility that a user changes the target record during the question and answer session, the current probability for records is allowed to decay back towards the initial probability. For example, the new probability can be calculated from:

$$p(x)=(0.2 \times p_i(x) + 0.8 \times p(x)) \times p(w|x)$$

where $p_i(x)$ is the initial probability.

It can be seen that with a decay set by the numbers 0.2 and 0.8, the current probability can be made to decay towards the initial probability if the word probability does not modify the current probability.

If in step S102 the user's input does match an expected answer, the answer translator, in step S108, translates the input to keywords if the answer has keywords associated with it. Alternatively, if there is an instruction associated with an expected answer to set the selected record identifier to a record number or to set the rejected record identifier to a record number, this is done. In step S109 it is then determined whether the selected record identifier identifies a record. If so, this means that a record has been selected and in step S110 the record is output. If in step S109 no record is identified by the selected record identifier, in step S111 it is determined whether the rejected record identifier identifies a record. If not, this means that the answer translator has determined keywords associated with the answer and these are added to the keyword list in step S104 to be used in step S105 to revise the score for each record. The revised score can then be used in step S106 to select the next question to ask a user for output in step S107.

If in step S111 it is determined that there is a record identified by the rejected record identifier, in step S112 the score for the record is fixed to zero and the process to select a next question to ask a user in step S106 is carried out with the score for the record fixed to zero. If step S112 has been carried out a number of times, there can be a number of rejected records listed for which the scores are fixed to zero.

These are listed in the rejected record list to ensure that their scores remain fixed at zero in the current scores used by the question selector to determine the next question to ask a user.

The method by which the next question is determined using the scores for each record will now be described with reference to the flow diagrams of FIGS. 12 and 13.

The algorithm to identify the next question is based on a recursive process wherein for each question and for each record an estimate is made as to the least number of questions needed to arrive at the record after answering the question.

The algorithm for selecting the next question to ask the user is based on an optimal or best answer assumption. Each question has associated with it expected answers. The assumption is that if a question is asked, the user will give the best answer to reach a target record.

Because the expected answers to the questions are known, it is possible to generate a sequence of questions and predicted answers in order to reach a target record. Using these predicted answers it is possible to select a good path, i.e., a path having the least number of questions for every record. Thus the algorithm operates by looking at each question and predicting a response. The predicted response is then used to calculate predicted scores for the records and the predicted scores for the records are then used to select a next question. This process repeats to find paths using a sequence of questions and predicted answers to reach each record. The shortest path length reach record is selected and an average of the shortest path lengths is taken wherein the average is weighted by the current probability for each respective record.

This process will be described in more detail with reference to FIGS. 12 and 13.

In step S201 the question index Q is set to 1 to start the first question, and in step S202 the record index x is set to 1 to start the first question. In step S203, assuming a user wishes to retrieve record x, the path is predicted after question Q in order to retrieve question x and the path length is stored as $DL(x)$. Then in step S204 the record index is incremented and in step S205 it is determined whether there are more records to process and if so the process returns to step S203 to predict path lengths $DL(x)$ for these records. Once all the records have been processed in step S206, the path length for the question is taken as the weighted average of the shortest path lengths to each record. The weighting used is the probability for each respective record. The equation for the calculation of the path length for each question is given by:

$$\Sigma p(x)\ DL(x).$$

In step S207 the question index Q is incremented and in step S208 it is determined whether all questions have been evaluated. If not the process returns to step S202 to continue the evaluation for each question and for each record. If all questions have been evaluated to determine the weighted average of the shortest path lengths, in step S209 the question is selected which has the shortest path length.

Thus for each question the path length is determined as an average path length taking into account the likelihood that the user will take a particular path to a particular record (because its probability is higher). Thus the process uses a statistical process to select the most suitable next question to arrive most quickly at a record.

The process of predicting the path to a record in step S203 of FIG. 12 will now be described in more detail with reference to FIG. 13.

In step S300 an answer is chosen which a user would give to arrive at the record x. The predicted answer is then translated in step S301 to look up the keywords or action relating to the answer. If in step S302 the action selects a record, in step S303 a path length equal to 1 is returned. If a record is not selected, in step S304 the keywords are used to update the predicted probability for the record $p(x)$. The process then has to select the next question in the path and this is done by initially setting the question index to 1 and predicting the path length again using the same process as step S203. In step S307 the predicted path length $DL(x)$ is stored and in step S308 the question index is incremented. In step S309 it is then determined whether all of the questions have been processed and if not the process returns to step S306. If all of the questions have been processed, in step S310, the shortest path length is selected and in step S311 the shortest path length +1 is returned.

Figure 12:
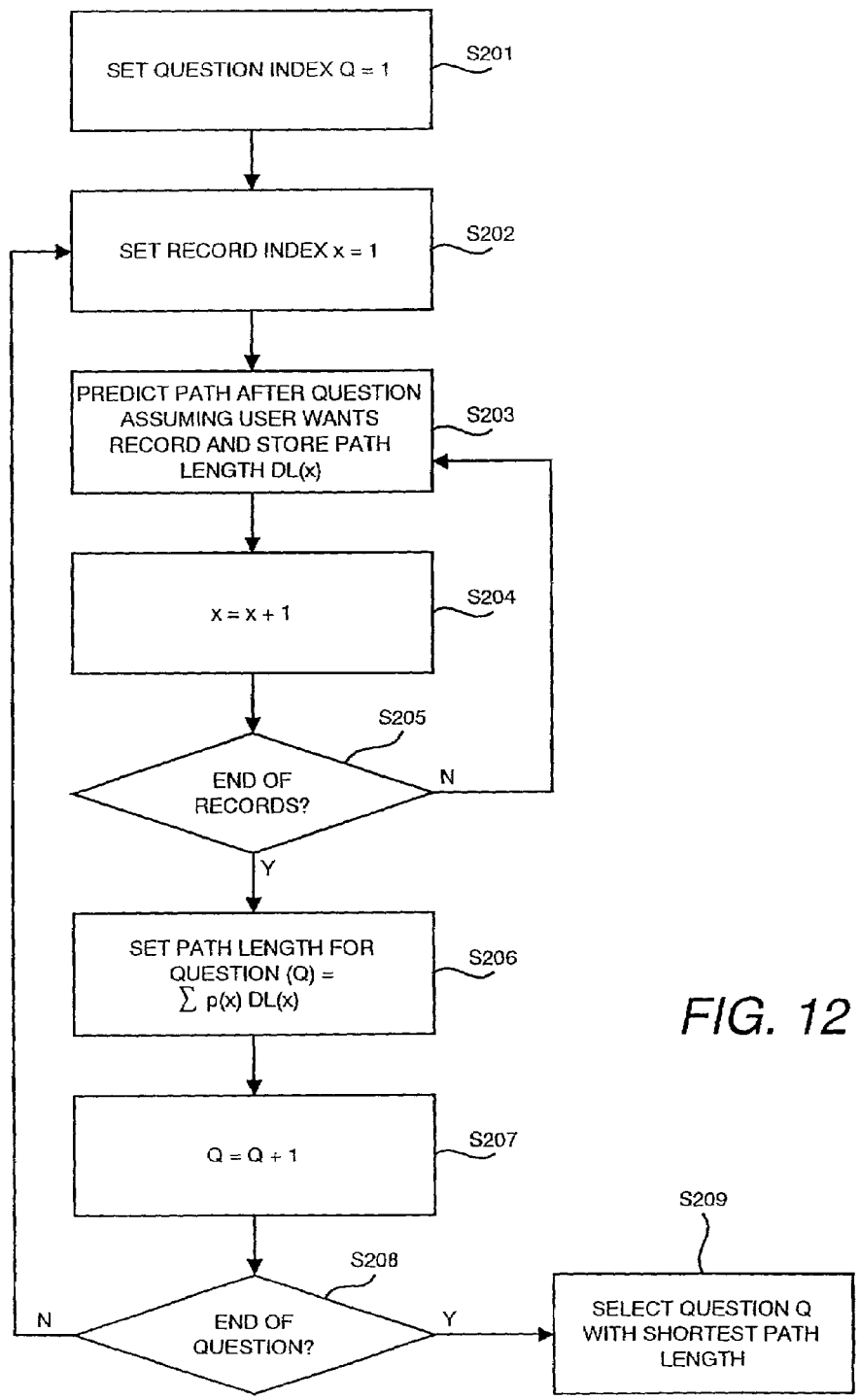
FIG. 12 is a flow diagram of the process for selecting the next question in accordance with an embodiment of the present invention.
Figure 13:
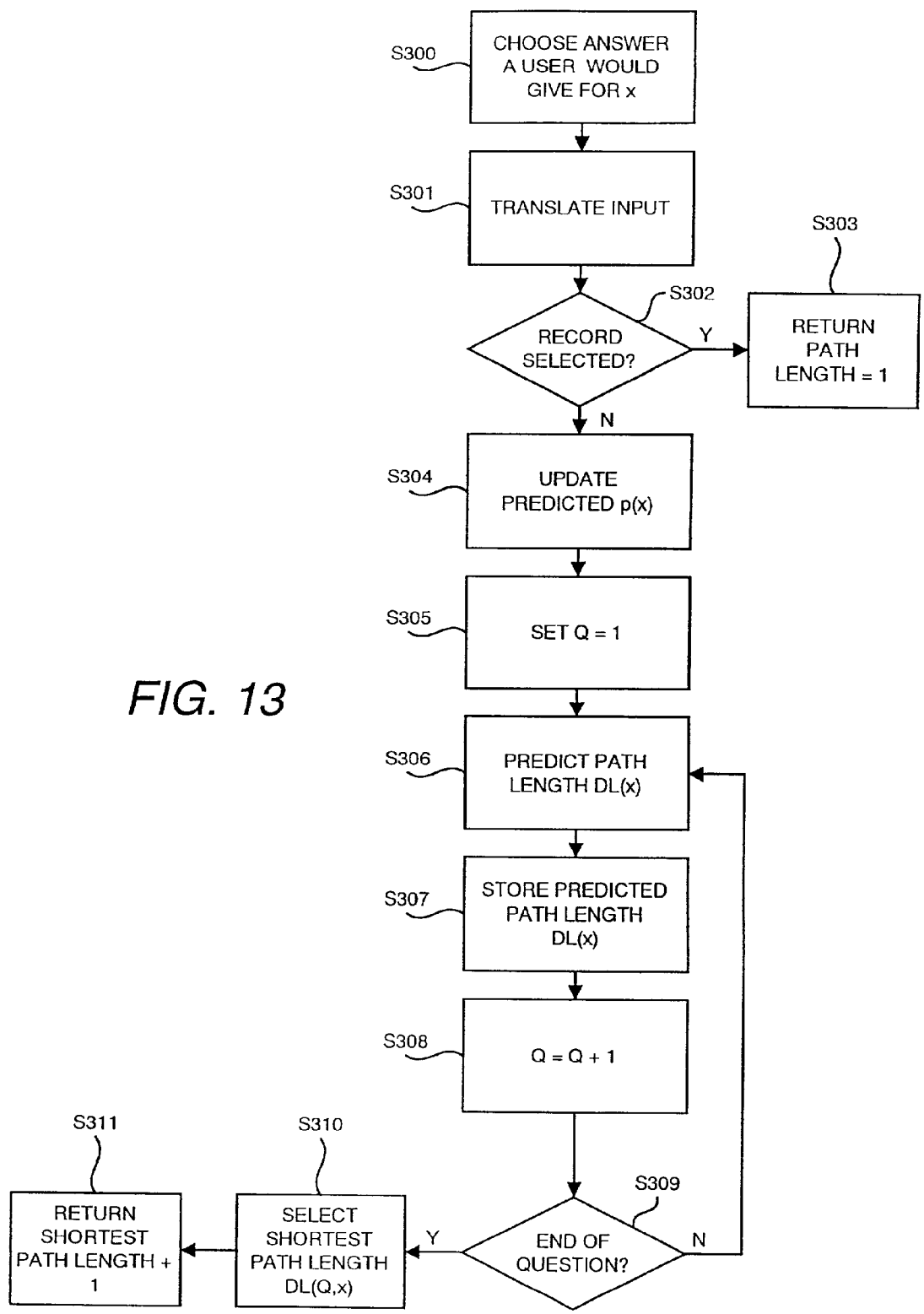
FIG. 13 is a flow diagram illustrating the path prediction step in the flow diagram of FIG. 12 in more detail.

Thus FIGS. 12 and 13 comprise a recursive process used to identify path lengths for each next question to each record, where the path length comprises a sequence of questions of shortest length.

In the algorithms described with reference to FIGS. 12 and 13, the processing can be quite demanding where there are a large number of questions and/or a large number of records. The following embodiments describe optimisation techniques in order to reduce the processing requirements of the algorithm.

In a first optimisation embodiment, instead of including all records in the algorithm, at each loop in the algorithm only records which are likely to be selected by the user are processed. These records are identified by their probabilities. Thus only records which have a probability above a threshold are included in the list of records at each loop of the procedure. This avoids having to process unlikely records.

A second optimisation embodiment comprises limiting the recursion depth. The number of questions included in the path length can be set to a threshold, e.g., 10. Once the algorithm recursively calculates the length $DL(x)$ as reaching 10, it can stop and simply return a maximum value, i.e., 10. This assumes that there will be some other question which will provide a lower expected path length $DL(x)$ which will be selected.

A third optimisation embodiment comprises only selecting questions which are likely to have a positive effect. Since the questions have expected answers and actions or keywords associated with the expected answers, the predicted effect on the record having the highest probability can be determined. If the expected answer to a question generates keywords which can increase the probability for the record with the highest probability, this indicates that it could be a useful question to ask. In this way the number of questions which have to be processed can be reduced by ignoring questions which cannot increase the probability of the highest probability record.

A fourth optimisation embodiment involves the pre-selection of questions. Thus rather than calculating the path $DL(x)$ for every question, it is only calculated for a small number of questions. The questions can be pre-selected by giving the questions a score and only selecting the questions which have a score above a threshold or selecting a group of questions which have the highest scores.

There are many ways in which scores can be attributed to questions. One way is to assign a question the probability for the record having the highest probability after answering the question. Another method is to assign a high score to questions which relate to the same topic as a previous dialogue, i.e., question and an answer. Another method is to assign a high score to questions that relate to the same topic as all previous dialogues, i.e., questions and answers.

Questions that relate to the same topic can be determined by comparing the topic data entry for the question (see FIGS. 7A and 7B) with the topic data entry for one or more previous user inputs.

Thus by assigning scores to questions it is possible to select questions with a score over a threshold, or a fixed number of questions with the highest score and calculations need only be carried out for these.

Any one of these processes for calculating probabilities or scores for questions can be used alone or in combination. For example, a weighted average of the three determined scores can be assigned to each question.

A further feature of an embodiment of the present invention will now be described with reference to FIG. 8.

Imagine a user says "I want Salsa" but the speech recognition for this misunderstands it as "I one these are". This sort of errors can easily happen because of noise, deformations of the voice over a telephone line, unclear pronunciation or accent and many other reasons. In this case the system will not have good terms for deciding what the user wants.

Also, the user could change interest during the dialogue with the system e.g., a user first asks for Salsa and later for jazz. Further, a user input such as an initial input could lack useful keywords e.g., "I would like to buy a record with some dance music". The keywords "dance music" may not be particularly distinctive if there are thousands of records relating to dance music.

It can thus be useful to indicate to the user that the system is uncertain, or in other words that the supplied terms are not effective in differentiating between records. The system can indicate uncertainty by feedback to the user such as by saying "I am not very sure. Do you want classical music?".

Thus this further feedback to a user can help a user to try to think of a more useful input to identify the record being sought.

In this embodiment records are organised in a hierarchical structure by calculating the similarity between records e.g. classifying the records. This can result in a tree as illustrated in FIG. 8 wherein the records comprise the leaves of the tree. Every node in the tree is assigned a value calculated as the sum of the probabilities or scores of the leaves of which it is a parent. In FIG. 8 probability values are used and hence at any level in the hierarchy the probability adds up to 1.0.

Thus in the storage of the current record scores, scores for nodes of the hierarchical tree can also be stored to facilitate the feature of indicating uncertainty to a user. The probability values for each node can be adjusted in accordance with the adjustments made to the probability values for the records in the hierarchy below the nodes.

This hierarchical structure of probabilities can be used for indicating uncertainty to a user by setting a threshold probability value, e.g. 0.6 shown in FIG. 8. Using this threshold probability value, nodes in the hierarchical structure which have probabilities above and below the threshold can be identified. If no nodes can be identified having a probability above the threshold value at a suitable level in the hierarchy, this indicates that no distinctive records have been identified and uncertainty can be indicated to a user.

The embodiment described above with reference to FIGS. 1 to 8 may be modified by adding the reconfiguration interface shown in FIG. 9 and the processor configured to enable the method illustrated by FIGS. 11 to 13 to be carried out in addition to the method illustrated by FIG. 6 so that the bookmark facility described with reference to FIGS. 1 to 8 may be implemented with the question determining procedure described with reference to FIGS. 9 to 13, 7A, 7B and 8.

Although the present invention has been described hereinabove with reference to specific embodiments, modifications will be apparent to a skilled person in the art which lie within the spirit and scope of the present invention.

Although in the embodiments probabilities used for words and records, any form of score can be used.

As described above, a "final" question is used to cause the selection of a record for output. However, the selection of a record for output can alternatively take place by selecting a record which has a score which is significantly high, e.g., as a score above a threshold which is greater than other scores by a threshold amount.

As described above, the bookmark comprises a spoken bookmark (a manual bookmark). The bookmark can, however, be manually input in any way, e.g., using a keyboard.

As described with reference to FIG. 11, expected answers have keywords, rejected records or selected records associated with them. The present invention also encompasses a combination, e.g., keywords and records to be rejected in response to the associated answer.

The present invention is applicable to any means by which questions and answers can be conveyed to and from a user to the system. The user interface can comprise speech or text for example.

The present invention is applicable to the selection of any type of machine operation from a number of possible machine operations. For example, the present invention is applicable to the selection of data records for retrieval, e.g., the retrieval of images, text, audio and video. Alternatively, the machine operation can simply comprise the marking or identification of a selected record. Further, the machine operation can be the selection and execution of a spoken dialogue module such as a VoXML file. Also, the present invention is applicable to call centre technology wherein the selected machine operation is the routing of a telephone call or the selection of a service. Further, the present invention is applicable to telephone banking wherein the selection of banking services and banking information can be achieved.

Embodiments of the present invention can be intended to provide bookmarks for individual users and can thus provide individual user profiles.

The present invention can be implemented by dedicated hardware configured to perform the functions of the system.

More preferably, the present invention is implemented in a processing system by computer program code. Such a processing system can be provided in any form of apparatus, such as in a photocopying machine, facsimile machine, mobile telephone, or a general purpose computer.

The present invention thus encompasses program code for controlling a processor to implement a method. The program code can be loaded into the processing system from any conventional carrier medium such as a transient carrier medium (e.g., an electrical signal carrying the program code) or a storage medium, such as a floppy disk drive, CD ROM, magnetic tape device or solid state device.

The invention claimed is:

1. A machine having a machine interface to allow a user to select a machine operation, the machine interface comprising:
   outputting means for outputting questions to the user;
   inputting means for receiving input answers to the questions; and
   processing means for determining a set of data from at least one said input answer and for using the set of data to execute a said machine operation and for determining a question for output by said outputting means, said processing means being adapted to store a set of data determined from at least one said input answer identified as a bookmark and to retrieve said set of data when the bookmark identifier is determined from a said input answer;

keyword determining means for determining keywords using the said at least one input answer, wherein said set of data comprises at least one keyword and said bookmark identifier comprises said at least one keyword;

score storage means for storing a score for each of a plurality of machine operations, the score indicating the likelihood that the user will select a corresponding machine operation keyword; and storage means for storing said at least one keyword and scores for said at least one keyword for each machine operation, said scores indicating the likelihood that a user wishes to select a machine operation having caused a said keyword to be input, said processing means being adapted to use the determined keywords and said keyword storage means to adjust said scores in said score storage means, to use the adjusted scores to identify said machine operation to be executed, and to adjust the scores for kevwords stored in said keyword storage means using said at least one keyword of said bookmark identifier.

2. A machine according to claim 1, wherein said processing means is adapted to automatically determine said bookmark identifier using the response to an initial question when a said machine operation is selected to be executed.

3. A machine according to claim 1, wherein said inputting means is adapted to input a bookmark instruction and a said bookmark identifier, said processing means being responsive to said bookmark instruction to store the current set of data determined from said at least one input answer identified by said bookmark identifier.

4. A machine according to claim 1, wherein said processing means is adapted to execute a said machine operation when said set of data uniquely identifies said machine operation.

5. A machine according to claim 1, wherein said processing means is adapted to determine said set of data from pieces of input information.

6. A machine according to claim 5, wherein said processing means is adapted to execute a said machine operation when said set of data is complete.

7. A machine according to claim 1, wherein said processing means is adapted to determine said set of data by looking up data associated with an output question using the input answer.

8. A machine according to claim 1, wherein said processing means is adapted to select a question for outputting by said outputting means in dependence upon previous answers received.

9. A machine according to claim 1, wherein said processing means is adapted to select a question for outputting by said outputting means from a list of questions.

10. A method of providing a machine interface to allow a user to select a machine operation, the method comprising:
outputting questions to the user;
receiving input answers to the questions;
determining a set of data from at least one said input answer;
using the set of data to execute a machine operation or determining and outputting a question to the user,
wherein a set of data determined from at least one input answer identified as a bookmark is stored and said set of data is retrieved when the bookmark identifier is determined from a said input answer;
determining keywords using the input answers, wherein the set of data comprises at least one keyword and the bookmark identifier comprises the at least one keyword;
providing a store with scores for a plurality of machine operations, each score indicating the likelihood that the user will select a corresponding machine operation;
providing a store of the at least one keyword and scores for the at least one keyword for each machine operation, the scores indicating the likelihood that a user wishes to select a machine operation having caused a said keyword input;
using the determined keywords to look up scores stored for keywords to adjust the scores for each machine operation;
using the adjusted scores to identify the machine operation to be executed; and
adjusting the scores for stored keywords using the at least one keyword of the bookmark identifier.

11. A method according to claim 10, wherein the bookmark identifier is automatically determined using the response to an initial question when a said machine operation is selected to be executed.

12. A method according to claim 10, including inputting a bookmark instruction and a said bookmark identifier, wherein the current set of data determined from the at least one input answer identified by the bookmark identifier is stored in response to the input of the bookmark instruction.

13. A method according to claim 10, wherein a said machine operation is executed when the set of data uniquely identifies the machine operation.

14. A method according to claim 10, wherein the set of data is determined from pieces of input information.

15. A method according to claim 14, wherein a said machine operation is executed when the set of data is complete.

16. A method according to claim 10, wherein the set of data is determined by looking up data associated with an output question using the input answer.

17. A method according to claim 10, wherein a question is selected for outputting in dependence upon previous answers received.

18. A method according to claim 10, wherein a question is selected for outputting from a list of questions.

19. A program code stored on a computer readable medium for controlling a processor to implement the method claim 10.

20. A machine having a machine interface to allow a user to select a machine operation, the machine interface comprising:
question storage means for storing a plurality of questions for output to the user;
score storage means for storing a score for each of a plurality of machine operations, said score indicating the likelihood that the user will select a corresponding machine operation;
question selection means for selecting a next question for output to the user from said question storage means by determining, for each of a plurality of said questions, an average of the least number of questions required to be answered by the user to arrive at each said machine operation weighted by the respective scores, and selecting a question having the lowest average number;

outputting means for outputting the selected question to the user;

inputting means for receiving an input answer to the question from the user; and processing means for responding to the input answer by carrying out a said machine operation and/or by adjusting the scores for each of the plurality of machine operations stored in said operation storage means, said question selection means being adapted to carry out at least one further selection of a said next question using the adjusted scores stored in said operation storage means for output by said outputting means.

21. A machine according to claim 20, wherein said question storage means is adapted to store, for a specified answer, for each of a plurality of the questions, an identifier for a corresponding machine operation to be carried out in response to input of the specified answer, and said processing means is responsive to a said specified answer to a said question to carry out the machine operation identified by a corresponding the identifier for the specified answer.

22. A machine according to claim 20, wherein said processing means is responsive to the input answer to carry out a said machine operation having the most significant score stored in said operation storage means.

23. A machine according to claim 20, wherein said question storage means is adapted to store expected answers to the questions from the user, and said question selection means is adapted to determine the least number of questions by predicting the expected answers input by the user to select each of the machine operations.

24. A machine according to claim 20, including word storage means for storing keywords for each of said plurality of machine operations;

and keyword determining means for determining keywords using said input answer;

wherein said processing means is adapted to match the determined keywords to the keywords stored in said word storage means, and to adjust the scores for each of the plurality of machine operations in dependence upon the matching.

25. A machine according to claim 24, wherein said word storage means is adapted to store scores for the keywords for each of the plurality of machine operations, and said processing means is adapted to determine scores for determined keywords for each of the plurality of machine operations by matching the determined keywords to the keywords stored in said word storage means, and to adjust the scores for each of the plurality of machine operations using the determined scores for keywords.

26. A machine according to claim 24, wherein said question storage means is adapted to store keywords associated with expected answers to at least some of the questions, and said keyword determining means is adapted to determine keywords from the association with an input answer using said question storage means.

27. A machine according to claim 20, wherein said question selection means is adapted to use a recursive process for the determining process to identify sequences of questions to select each the machine operation.

28. A machine according to claim 27, wherein said question selection means is adapted to carry out the recursive process for each sequence until the sequence length reaches a threshold length.

29. A machine according to claim 20, wherein said question selection means is adapted to perform the determining for each of a plurality of questions, by determining an average of the least number of questions required to be answered to arrive at only the machine operations having the highest scores weighted by the respective scores.

30. A machine according to claim 20, wherein said question selection means is adapted to perform the determining only for questions the answers to which can cause the score of a most likely machine operation to increase.

31. A machine according to claim 20, wherein said question selection means is adapted to select a plurality of the questions for use as the plurality of questions in the determining process by selecting a plurality of questions assigned the highest score, and to determine scores for the questions by using at least one of three techniques, namely;

I. taking the score of the machine instruction having the highest score after asking the question and predicting an answer;

II. assigning a high score to questions relating to the same topic as a previous input answer, and III. assigning a high score to questions relating to the same topic as any previous answers.

32. A machine according to claim 31, wherein said question selection means is adapted to determine scores for the questions by using all three techniques and taking a weighted average of the determined scores.

33. A machine according to claim 20, wherein said score storage means is adapted to store scores for hierarchical classifications of the machine operations, each hierarchical classification comprising a topic to which the machine operations in the hierarchy below relate and having a score comprising the sum of the scores for the machine operations in the hierarchy below, the machine interface including uncertainty means for indicating uncertainty to a user if the score for any of the hierarchical classifications at predetermined level of hierarchical classification is below a threshold.

34. A machine according to claim 20, including means for uniformly decaying the scores for each said machine operation stored in said score storage means by a predetermined amount after a question has been answered.

35. A machine according to claim 20, including means to allow questions to be entered into or adjusted in said question storage means.

36. A machine according to claim 20, including means to allow scores to be entered into or adjusted in said score storage means.

37. A machine according to claim 24, including means to allow words to be entered into or adjusted in said word storage means.

38. A machine according to claim 20, wherein said outputting means is adapted to generate speech and said inputting means is adapted to recognise speech.

39. A method of providing a machine interface to allow a user to select a machine operation, the method comprising:

providing a stored plurality of questions for output to the user;

providing a stored score for each of a plurality of machine operations, each score indicating the likelihood that the user will select a corresponding machine operation;

selecting a next question for output to the user from the stored questions by determining, for each of a plurality of said questions, an average of the least number of questions required to be answered by the user to arrive at each said machine operation weighted by the respective scores, and selecting a question having the lowest average number;

outputting the selected question to the user;

receiving an input answer from the user; and responding to the input answer by carrying out a said machine operation and/or by adjusting the stored scores for each of the plurality of machine operations; and repeating the selecting step using the adjusted scores and subsequently repeating the outputting, receiving and responding steps.

40. A method according to claim 39, wherein for a specified answer, for each of a plurality of said questions, an identifier for a corresponding machine operation to be carried out in response to input of said specified answer is stored, and in response to said specified answer being received from the user to a said question, the machine operation identified by a corresponding said identifier for a specified answer is executed.

41. A method according to claim 39, wherein a said machine operation having a stored score which is of a threshold significance is executed in response to the input answer.

42. A method according to claim 39, wherein expected answers to said questions from the user are stored with the questions, and in said selecting step, the least number of questions is determined by predicting the expected answers input by the user to select each of the machine operations.

43. A method according to claim 39, including providing stored keywords for each of the plurality of machine operations, and determining keywords using the input answer, wherein the input answers are responded to by matching the determined keywords to the stored keywords and adjusting the scores for each of the plurality of machine operations in dependence upon the matching step.

44. A method according to claim 43, wherein scores for the keywords for each of the plurality of machine operations is stored, scores for determined keywords for each of the plurality of machine operations are determined by matching the determined keywords to the stored keywords, and the scores for each of said plurality of machine operations are adjusted using the determined scores for keywords.

45. A method according to claim 43, wherein keywords associated with expected answers to at least some of the questions are stored, and the step of determining keywords comprises determining keywords from the association of stored keywords with an input answer.

46. A method according to claim 39, wherein the selecting step comprises a recursive process to identify sequences of questions to select each said machine operation.

47. A method according to claim 46, wherein the selecting step carries out the recursive process for each sequence until the sequence length reaches a threshold length.

48. A method according to claim 39, wherein in the selecting step the determination for each of a plurality of questions is carried out by determining an average of the least number of questions required to be answered to arrive at only the machine operations having the highest scores weighted by the respective scores.

49. A method according to claim 39, wherein the selecting step performs the determination only for questions the answer to which can cause the score for a most likely machine operation to increase.

50. A method according to claim 39, wherein said selection step selects a plurality of said questions for use as the plurality of questions in the determination by selecting a plurality of questions assigned the highest score, and determines scores for the questions by using at least one of three techniques, namely:
(i) taking the score of the machine instruction having the highest score after asking the questions and predicting an answer,
(ii) assigning a high score to questions relating to the same topic as a previous input answer, and
(iii) assigning a high score to questions relating to the same topic as any previous input answers.

51. A method according to claim 50, wherein said selecting step determines scores for the questions by using all three techniques and taking a weighted average of the determined scores.

52. A method according to claim 39, wherein scores for hierarchical classifications of the machine operations are stored, each hierarchical classification comprising a topic to which the machine operations in the hierarchy below relate and having a score comprising the sum of the scores for the machine operations in the hierarchy below; the method including indicating uncertainty to a user if the score for any of the hierarchical classifications at a predetermined level of hierarchical classification is below a threshold.

53. A method according to claim 39, including uniformly decaying the scored scores for each said machine operation by a predetermined amount after a question has been answered.

54. A method according to claim 39, including receiving and storing new questions, or receiving instructions to adjust stored questions.

55. A method according to claim 39, including receiving and storing new scores for new machine operations, or instructions to adjust stored scores for current machine operations.

56. A method according to claim 43, including receiving and storing new keywords or receiving instructions to adjust stored keywords.

57. A method according to claim 39, wherein the outputting step includes the generation of speech and the inputting step includes the recognition of speech.

58. A program code stored on a computer readable medium for controlling a processor to carry out the method claim 39.

59. A machine having a machine interface to allow a user to select a machine operation, the machine interface comprising:

score storage means for storing a score for each of a plurality of machine operations, said score indicating the likelihood that the user will select a corresponding machine operation;

question selection means for selecting a next question for output to the user from a question storage means by determining, for each of a plurality of said questions, an average of the least number of questions required to be answered by the user to arrive at each said machine operation weighted by the respective scores, and selecting a question having the lowest average number;

outputting means for outputting the selected question to the user;

inputting means for receiving an input answer to the question from the user; and processing means for responding to the input answer by carrying out a said machine operation and/or by adjusting the scores for each of the plurality of machine operations stored in said operation storage means;

said question selection means being adapted to carry out at least one further selection of a said next question using the adjusted scores stored in said operation storage means for output by said outputting means; and said processing means further being adapted to store a set of data determined from at least one said input answer identified as a bookmark and to retrieve said set of data when the bookmark identifier is determined from a said input answer.

60. A method of providing a machine interface to allow a user to select a machine operation, the method comprising:
   providing a stored score for each of a plurality of machine operations, each score indicating the likelihood that the user will select a corresponding machine operation;
   selecting a next question for output to the user from a plurality of stored questions by determining, for each of a plurality of said questions, an average of the least number of questions required to be answered by the user to arrive at each said machine operation weighted by the respective scores, and selecting a question having the lowest average number;
   outputting the selected question to the user;
   receiving an input answer from the user;
   responding to the input answer by carrying out a said machine operation and/or by adjusting the stored scores for each of the plurality of machine operations; and
   repeating the selecting step using the adjusted scores and subsequently repeating the outputting, receiving and responding steps, which method further comprises identifying whether an input answer corresponds to a stored bookmark and when the input answer is identified as corresponding to a stored bookmark, retrieving a set of data corresponding to that bookmark.

61. A program code stored on a computer readable medium for controlling a processor to carry out the method claim 60.

* * * * *

UNITED STATES PATENT AND TRADEMARK OFFICE
CERTIFICATE OF CORRECTION

PATENT NO. : 7,043,439 B2
APPLICATION NO. : 09/817342
DATED : May 9, 2006
INVENTOR(S) : Uwe Helmut Jost et al.

It is certified that error appears in the above-identified patent and that said Letters Patent is hereby corrected as shown below:

ON COVER PAGE [56] REFERENCES CITED

Other publications, "Dauncey, E. et al.," (first occurrence) should read --Dauncey, E.A., et al.,-- and "pp. 124-230." should read --pp. 124-130.--.

ON COVER PAGE [56] REFERENCES CITED

Other publications, After "Hansen, M.,": "Vol. 15, No. 2" should read --Seminars in Dermatology, vol. 15, No. 2--.

COLUMN 2

Line 11, "is" should read --are--; and
Line 13, "for the or" should read --for--.

COLUMN 4

Line 1, "natural" should read --natural,--.

COLUMN 5

Line 38, "is" should read --are--.

COLUMN 6

Line 26, "and" should be deleted.

COLUMN 12

Line 3, "comprises" should read --comprise--;
Line 59, close up right margin; and
Line 60, close up left margin.

COLUMN 16

Line 26, "comprises" should read --comprise--.

COLUMN 19

Line 19, "errors" should read --error--.

UNITED STATES PATENT AND TRADEMARK OFFICE
CERTIFICATE OF CORRECTION

PATENT NO. : 7,043,439 B2
APPLICATION NO. : 09/817342
DATED : May 9, 2006
INVENTOR(S) : Uwe Helmut Jost et al.

It is certified that error appears in the above-identified patent and that said Letters Patent is hereby corrected as shown below:

COLUMN 21

Line 26, "kevwords" should read --keywords--.

COLUMN 22

Line 50, "method" should read --method of--.

COLUMN 23

Line 20, "the" (first occurrence) should read --said--;
Line 35, "answer;" should read --answer,--; and
Line 59, "the" should read --said--.

COLUMN 24

Line 12, "namely;" should read --namely:--;
Line 15, "answer;" should read --answer,--; and
Line 32, "at" should read --at a--.

COLUMN 25

Line 33, "is" should read --are--.

COLUMN 26

Line 36, "method" should read --method of--.

UNITED STATES PATENT AND TRADEMARK OFFICE
CERTIFICATE OF CORRECTION

PATENT NO. : 7,043,439 B2
APPLICATION NO. : 09/817342
DATED : May 9, 2006
INVENTOR(S) : Uwe Helmut Jost et al.

It is certified that error appears in the above-identified patent and that said Letters Patent is hereby corrected as shown below:

<u>COLUMN 28</u>

Line 9, "bookmark" should read --bookmark,--; and
Line 13, "method" should read --method of--.

Signed and Sealed this

Twenty-second Day of May, 2007

JON W. DUDAS
*Director of the United States Patent and Trademark Office*